United States Patent [19]

Cozewith et al.

[11] Patent Number: 4,959,436

[45] Date of Patent: * Sep. 25, 1990

[54] NARROW MWD ALPHA-OLEFIN COPOLYMERS

[75] Inventors: Charles Cozewith, Westfield; Shiaw Ju, Edison; Gary W. Verstrate, Matawan, all of N.J.

[73] Assignee: Exxon Research and Engineering Co., Florham Park, N.J.

[*] Notice: The portion of the term of this patent subsequent to Dec. 20, 2005 has been disclaimed.

[21] Appl. No.: 212,279

[22] Filed: Jun. 27, 1988

Related U.S. Application Data

[60] Continuation of Ser. No. 745,873, Jun. 17, 1985, Pat. No. 4,792,595, which is a division of Ser. No. 504,582, Jun. 15, 1983, Pat. No. 4,540,753.

[51] Int. Cl.$^5$ .............................................. C08F 10/00
[52] U.S. Cl. ................................ 526/348; 526/348.2; 526/348.3; 526/348.4; 526/348.5; 526/348.6; 526/348.7; 525/323; 525/331.7
[58] Field of Search ................... 526/348, 348.2, 348.3, 526/348.4, 348.5, 348.6, 348.7; 525/323, 331.7

[56] References Cited

U.S. PATENT DOCUMENTS

| | | |
|---|---|---|
| 3,162,620 | 12/1964 | Gladding et al. |
| 3,378,606 | 4/1975 | Kontos |
| 3,380,978 | 4/1968 | Ryan et al. |
| 3,522,180 | 7/1970 | Sweeney et al. |
| 3,551,336 | 12/1970 | Jacobson et al. |
| 3,625,658 | 12/1971 | Closon |
| 3,681,306 | 8/1972 | Wehner |
| 3,691,078 | 10/1972 | Johnston et al. |
| 3,697,429 | 10/1972 | Engel et al. |
| 3,790,480 | 2/1974 | Campbell et al. |
| 3,853,969 | 12/1974 | Kontos |
| 3,879,494 | 4/1975 | Milkovich et al. |
| 4,065,520 | 12/1977 | Bailey et al. |
| 4,078,131 | 3/1978 | de Zarauz |
| 4,135,044 | 1/1979 | Beals |
| 4,192,935 | 3/1980 | Lovell et al. |
| 4,205,021 | 5/1980 | Morito et al. |
| 4,259,468 | 3/1981 | Kajiura et al. |
| 4,363,904 | 12/1982 | Fraser et al. |
| 4,405,774 | 9/1983 | Miwa et al. |
| 4,429,079 | 1/1984 | Shibata et al. |
| 4,540,753 | 9/1985 | Cozewith et al. |
| 4,666,619 | 5/1987 | Kresge |
| 4,716,207 | 12/1987 | Cozewith et al. |
| 4,786,697 | 11/1988 | Cozewith et al. |
| 4,789,714 | 12/1988 | Cozewith et al. |
| 4,792,595 | 12/1988 | Cozewith et al. |
| 4,843,129 | 6/1989 | Spenadel et al. |

FOREIGN PATENT DOCUMENTS 060609 9/1982 European Pat. Off.

OTHER PUBLICATIONS

Cazes, J. Editor, "*Liquid Chromotography of Polymers and Related Materials III*" Marcel Dekker, 1981, On Line Determination by Light Scattering of Mechanical Degradation in the GPC Process, Rooney, J. G. & VerStrate, G., p. 207.

H. Inagaki and T. Tanaku, *Developments in Polymer Characterization*, vol. 3, 1 (1982).

1981 MMI International Symposium on "Transition Metal Catalyzed Polymerzations", *Unsolved Problems*. Makromol. Chem., Rapid Commun. 3, 225–229 (1982), DOI, Y. Yeki S., *Block Copolymerization of Propylene and Ethylene with the "Living"*...

C. K. Shih, *Transactions of the Society of Rheology*, vol. 14, "The Effect of Molecular Weight and Molecular Weight Distribution on the Non-Newtonian Behavior of Ethylene-Propylene-Diene Polymers," John Wiley & Sons Inc. (1970), pp. 83–114.

C. Cozewith and G. VerStrate, *Macromolecules*, vol. 4, (List continued on next page.)

Primary Examiner—Joseph L. Schofer
Assistant Examiner—Peter D. Mulcahy
Attorney, Agent, or Firm—W. G. Muller

[57] ABSTRACT

The present invention relates to novel copolymers of alpha-olefins comprised of intramolecularly heterogeneous and intermolecularly homogeneous copolymer chains.

84 Claims, 6 Drawing Sheets

OTHER PUBLICATIONS

"Ethylene-Propylene Copolymers, Reactivity Ratios, Evaluation, and Significance," (1971) pp. 482-489.

M. Cantow, Editor, *Academic*, "Polymer Fractionation", (1967), p. 341 ff.

E. Junghanns, A. Gumboldt, and G. Bier, *Makromol. Chem.*, vol. 58, "Polymerization of Ethylene and Propylene to Amorphous Copolymers with Catalysts of Vanadium Oxychloride and Alkyl Aluminum Halides," (1962), pp. 18-42.

J. F. Wehner, *Chemical Reaction Engineering-Houston*, "Laminar Flow Polymerization of EPDM Polymer" ACS Symposium Series 65 (1978), pp. 140-152.

Yutaka Mitsuda, John L. Schrag, and John D. Ferry, *Journal of Applied Polymer Science*, vol. 18, "Estimation of Long-Chain Branching in Ethylene-Propylene Terpolymers from Infinite-Dilution Viscoelastic Properties," John Wiley & Sons Inc. (1974) pp. 193-202.

NARROW MWD ALPHA-OLEFIN COPOLYMERS

RELATED APPLICATION DATA

This application is a continuation of application Ser. No. 745,873, filed June 17, 1985, now U.S. Pat. No. 4,792,595, which is a divisional of application Ser. No. 504,582, filed June 15, 1983, issued as U.S. Pat. No. 4,540,753 on Sept. 10, 1985.

BACKGROUND OF THE INVENTION

The present invention relates to novel copolymers of alpha-olefins. More specifically, it relates to novel copolymers of ethylene with other alpha-olefins comprised of copolymer chains with compositions which are intramolecularly heterogeneous and intermolecularly homogeneous, as well as, to a process for making these copolymers and their use in lube oil and elastomer applications.

For convenience, certain terms that are repeated throughout the present specification are defined below:

a. Inter-CD defines the compositional variation, in terms of ethylene content, among polymer chains. It is expressed as the minimum deviation (analogous to a standard deviation) in terms of weight percent ethylene from the average ethylene composition for a given copolymer sample needed to include a given weight percent of the total co-polymer sample which is obtained by excluding equal weight fractions from both ends of the distribution. The deviation need not be symmetrical. When expressed as a single number for example 15% Inter-CD, it shall mean the larger of the positive or negative deviations. For example, for a Gaussian compositional distribution, 95.5% of the polymer is within 20 wt. % ethylene of the mean if the standard deviation is 10%. The Inter-CD for 95.5 wt. % of the polymer is 20 wt. % ethylene for such a sample.

b. Intra-CD is the compositional variation, in terms of ethylene, within a copolymer chain. It is expressed as the minimum difference in weight (wt.) % ethylene that exists between two portions of a single copolymer chain, each portion comprising at least 5 weight % of the chain.

c. Molecular weight distribution (MWD) is a measure of the range of molecular weights within a given copolymer sample. It is characterized in terms of at least one of the ratios of weight average to number average molecular weight, $\overline{M}_w/\overline{M}_n$, and Z average to weight average molecular weight, $\overline{M}_z/\overline{M}_w$, where:

$$M_w = \frac{\Sigma N_i M_i^2}{\Sigma N_i M_i}$$

$$M_n = \frac{\Sigma N_i M_i}{\Sigma N_i}, \text{ and}$$

$$M_z = \frac{\Sigma N_i M_i^3}{\Sigma N_i M_i^2}, \text{ wherein}$$

Ni is the number of molecules of weight Mi.

d. Viscosity Index (V.I.) is the ability of a lubricating oil to accommodate increases in temperature with a minimum decrease in viscosity. The greater this ability, the higher the V.I.

Ethylene-propylene copolymers, particularly elastomers, are important commercial products. Two basic types of ethylene-propylene copolymers are commercially available. Ethylene-propylene copolymers (EPM) are saturated compounds requiring vulcanization with free radical generators such as organic peroxides. Ethylene-propylene terpolymers (EPDM) contain a small amount of non-conjugated diolefin, such as dicyclopentadiene; 1,4-hexadiene or ethylidene norbornene, which provides sufficient unsaturation to permit vulcanization with sulfur. Such polymers that include at least two monomers, i.e., EPM and EPDM, will hereinafter be collectively referred to as copolymers.

These copolymers have outstanding resistance to weathering, good heat aging properties and the ability to be compounded with large quantities of fillers and plasticizers resulting in low cost compounds which are particularly useful in automotive and industrial mechanical goods applications. Typical automotive uses are tire sidewalls, inner tubes, radiator and heater hose, vacuum tubing, weather stripping and sponge doorseals and Viscosity Index (V.I.) improvers for lubricating oil compositions. Typical mechanical goods uses are for appliance, industrial and garden hoses, both molded and extruded sponge parts, gaskets and seals and conveyor belt covers. These copolymers also find use in adhesives, appliance parts as in hoses and gaskets, wire and cable and plastics blending.

As can be seen from the above, based on their respective properties, EPM and EPDM find many, varied uses. It is known that the properties of such copolymers which make them useful in a particular application are, in turn, determined by their composition and structure. For example, the ultimate properties of an EPM or EPDM copolymer are determined by such factors as composition, compositional distribution, sequence distribution, molecular weight, and molecular weight distribution (MWD).

The efficiency of peroxide curing depends on composition. As the ethylene level increases, it can be shown that the "chemical" crosslinks per peroxide molecule increases. Ethylene content also influences the rheological and processing properties, because crystallinity, which acts as physical crosslinks, can be introduced. The crystallinity present at very high ethylene contents may hinder processibility and may make the cured product too "hard" at temperatures below the crystalline melting point to be useful as a rubber.

Milling behavior of EPM or EPDM copolymers varies radically with MWD. Narrow MWD copolymers crumble on a mill, whereas broad MWD materials will band under conditions encountered in normal processing operations. At the shear rates encountered in processing equipment, broader MWD copolymer has a substantially lower viscosity than narrower MWD polymer of the same weight average molecular weight or low strain rate viscosity.

Thus, there exists a continuing need for discovering polymers with unique properties and compositions. This is easily exemplified with reference to the area of V.I. improvers for lubricating oils.

A motor oil should not be too viscous at low temperatures so as to avoid serious frictional losses, facilitate cold starting and provide free oil circulation right from engine startup. On the other hand, it should not be too thin at working temperatures so as to avoid excessive engine wear and excessive oil consumption. It is most desirable to employ a lubricating oil which experiences the least viscosity-change with changes in temperature.

The ability of a lubricating oil to accommodate increases in temperature with a minimum decrease in viscosity is indicated by its Viscosity Index (V.I.). The greater this ability, the higher the V.I.

Polymeric additives have been extensively used in lubricating oil compositions to impart desirable viscosity-temperature characteristics to the compositions. For example, lubricating oil compositions which use EPM or EPDM copolymers or, more generally, ethylene-($C_3$–$C_{18}$) alpha-olefin copolymers, as V.I. improvers are well known. These additives are designed to modify the lubricating oil so that changes in viscosity occurring with variations in temperature are kept as small as possible. Lubricating oils containing such polymeric additives essentially maintain their viscosity at higher temperatures while at the same time maintaining desirable low viscosity fluidity at engine starting temperatures.

Two important properties (although not the only required properties as is known) of these additives relate to low temperature performance and shear stability. Low temperature performance relates to maintaining low viscosity at very low temperatures, while shear stability relates to the resistance of the polymeric additives to being broken down into smaller chains.

The present invention is drawn to a novel copolymer of ethylene and at least one other alpha-olefin monomer which copolymer is intramolecularly heterogeneous and intermolecularly homogeneous. Furthermore, the MWD of the copolymer is very narrow. It is well known that the breadth of the MWD can be characterized by the ratios of various molecular weight averages. For example, an indication of a narrow MWD in accordance with the present invention is that the ratio of weight to number average molecular weight ($\overline{M}_w/\overline{M}_n$) is less than 2. Alternatively, a ratio of the Z-average molecular weight to the weight average molecular weight ($\overline{M}_z/\overline{M}_w$) of less than 1.8 typifies a narrow MWD in accordance with the present invention. It is known that the property advantages of copolymers in accordance with the present invention are related to these ratios. Small weight fractions of material can disproportionately influence these ratios while not significantly altering the property advantages which depend on them. For instance, the presence of a small weight fraction (e.g. 2%) of low molecular weight copolymer can depress $\overline{M}_n$, and thereby raise $\overline{M}_w/\overline{M}_n$ above 2 while maintaining $\overline{M}_z/\overline{M}_w$ less than 1.8. Therefore, polymers, in accordance with the present invention, are characterized by having at least one of $\overline{M}_w/\overline{M}_n$ less than 2 and $\overline{M}_z/\overline{M}_w$ less than 1.8. The copolymer comprises chains within which the ratio of the monomers varies along the chain length. To obtain the intramolecular compositional heterogeneity and narrow MWD, the copolymers in accordance with the present invention are preferably made in a tubular reactor. It has been discovered that to produce such copolymers requires the use of numerous heretofore undisclosed method steps conducted within heretofore undisclosed preferred ranges. Accordingly, the present invention is also drawn to a method for making the novel copolymers of the present invention.

Copolymers in accordance with the present invention have been found to have improved properties in lubricating oil. Accordingly, the present invention is also drawn to a novel oil additive composition which comprises basestock mineral oil of lubricating viscosity containing an effective amount of a viscosity index improver being copolymer in accordance with the present invention.

DESCRIPTION OF THE PRIOR ART

Representative prior art dealing with tubular reactors to make copolymers are as follows:

In "Polymerization of ethylene and propylene to amorphous copolymers with catalysts of vanadium oxychloride and alkyl aluminum halides"; E. Junghanns, A. Gumboldt and G. Bier; Makromol. Chem., v. 58 (12/12/62): 18–42, the use of a tubular reactor to produce ethylene-propylene copolymer is disclosed in which the composition varies along the chain length. More specifically, this reference discloses the production in a tubular reactor of amorphous ethylene-propylene copolymers using Ziegler catalysts prepared from vanadium compound and aluminum alkyl. It is disclosed that at the beginning of the tube ethylene is preferentially polymerized, and if no additional make-up of the monomer mixture is made during the polymerization the concentration of monomers changes in favor of propylene along the tube. It is further disclosed that since these changes in concentrations take place during chain propagation, copolymer chains are produced which contain more ethylene on one end than at the other end. It is also disclosed that copolymers made in a tube are chemically non-uniform, but fairly uniform as regards molecular weight distribution. Using the data reported in their FIG. 17 for copolymer prepared in the tube, it was estimated that the $\overline{M}_w/\overline{M}_n$ ratio for this copolymer was 1.6, and from their FIG. 18 that the intermolecular compositional dispersity (Inter-CD, explained in detail below) of this copolymer was greater than 15%.

"Laminar Flow Polymerization of EPDM Polymer"; J. F. Wehner; ACS Symposium Series 65 (1978); pp 140–152 discloses the results of computer simulation work undertaken to determine the effect of tubular reactor solution polymerization with Ziegler catalysts on the molecular weight distribution of the polymer product. The specific polymer simulated was an elastomeric terpolymer of ethylene-propylene-1,4-hexadiene. On page 149, it is stated that since the monomers have different reactivities, a polymer of varying composition is obtained as the monomers are depleted. However, whether the composition varies inter-or intramolecularly is not distinguished. In Table III on page 148, various polymers having $\overline{M}_w/\overline{M}_n$ of about 1.3 are predicted. In the third paragraph on page 144, it is stated that as the tube diameter increases, the polymer molecular weight is too low to be of practical interest, and it is predicted that the reactor will plug. It is implied in the first paragraph on page 149 that the compositional dispersity produced in a tube would be detrimental to product quality.

U.S. Pat. No. 3,681,306 to Wehner is drawn to a process for producing ethylene/higher alpha-olefin copolymers having good processability, by polymerization in at least two consecutive reactor stages. According to this reference, this two-stage process provides a simple polymerization process that permits tailor-making ethylene/alpha-olefin copolymers having predetermined properties, particularly those contributing to processability in commercial applications such as cold-flow, high green strength and millability. According to this reference, the inventive process is particularly adapted for producing elastomeric copolymers, such as ethylene/propylene/5-ethylidene-2-norbornene, using any of the coordination catalysts useful for making EPDM. The preferred process uses one tubular reactor followed by one pot reactor. However, it is also disclosed that one tubular reactor could be used, but operated at different reaction conditions to simulate two stages. As is seen from column 2, lines 14–20, the inventive process makes polymers of broader MWD than those made in a single stage reactor. Although intermediate polymer from the first (pipeline) reactor is disclosed as having a ratio of $\overline{M}_w/\overline{M}_n$ of about 2, as disclosed in column 5, lines 54–57, the final polymers produced by the inventive process have an $\overline{M}_w/\overline{M}_n$ of 2.4 to 5.

U.S. Pat. No. 3,625,658 to Closon discloses a closed circuit tubular reactor apparatus with high recirculation rates of the reactants which can be used to make elastomers of ethylene and propylene. With particular reference to FIG. 1, a hinged support 10 for vertical leg 1 of the reactor allows for horizontal expansion of the bottom leg thereof and prevents harmful deformations due to thermal expansions, particularly those experienced during reactor clean out.

U.S. Pat. No. 4,065,520 to Bailey et al discloses the use of a batch reactor to make ethylene copolymers, including elastomers, having broad compositional distributions. Several feed tanks for the reactor are arranged in series, with the feed to each being varied to make the polymer. The products made have crystalline to semi-crystalline to amorphous regions and gradient changes in between. The catalyst system can use vanadium compounds alone or in combination with titanium compound and is exemplified by vanadium oxy-trichloride and diisobutyl aluminum chloride. In all examples titanium compounds are used. In several examples hydrogen and diethyl zinc, known transfer agents, are used. The polymer chains produced have a compositionally disperse first length and uniform second length. Subsequent lengths have various other compositional distributions.

In "Estimation of Long-Chain Branching in Ethylene-Propylene Terpolymers from Infinite-Dilution Viscoelastic Properties"; Y. Mitsuda, J. Schrag, and J. Ferry; *J. Appl. Pol Sci.*, 18, 193 (1974) narrow MWD copolymers of ethylene-propylene are disclosed. For example, in TABLE II on page 198, EPDM copolymers are disclosed which have $\overline{M}_w/\overline{M}_n$ of from 1.19 to 1.32.

In "The Effect of Molecular Weight and Molecular Weight Distribution on the Non-Newtonian Behavior of Ethylene-Propylene-Diene Polymers; Trans. Soc. Rheol., 14, 83 (1970); C. K. Shih, a whole series of compositionally homogeneous fractions were prepared and disclosed. For example, the data in TABLE I discloses polymer Sample B having a high degree of homogeneity. Also, based on the reported data, the MWD of the sample is very narrow. However, the polymers are not disclosed as having intramolecular dispersity.

Representative prior art dealing with ethylene-alpha-olefin copolymers as lubricating oil additives are as follows:

U.S. Pat. No. 3,697,429 to Engel et al discloses a blend of ethylene-propylene copolymers having different ethylene contents, i.e., a first copolymer of 40–83 wt. % ethylene and $\overline{M}_w/\overline{M}_n$ less than about 4.0 (preferably less than 2.6, e.g. 2.2) and a second copolymer of 3–70 wt. % ethylene and $\overline{M}_w/\overline{M}_n$ less than 4.0, with the content of the first differing from the second by at least 4 wt. % ethylene. These blends, when used as V.I. improvers in lubricating oils, provide suitable low temperature viscosity properties with minimal adverse interaction between the oil pour depressant and the ethylene-propylene copolymer.

U.S. Pat. No. 3,522,180 discloses copolymers of ethylene and propylene having a number average molecular weight of 10,000 to 40,000 and a propylene content of 20 to 70 mole percent as V.I. improvers in lube oils. The preferred $\overline{M}_w/\overline{M}_n$ of these copolymers is less than about 4.0.

U.S. Pat. No. 3,691,078 to Johnston et al discloses the use of ethylene-propylene copolymers containing 25–55 wt. % ethylene which have a pendent index of 18–33 and an average pendent size not exceeding 10 carbon atoms as lube oil additives. The $\overline{M}_w/\overline{M}_n$ is less than about 8. These additives impart to the oil good low temperature properties with respect to viscosity without adversely affecting pour point depressants.

U.S. Pat. No. 3,551,336 to Jacobson et al discloses the use of ethylene copolymers of 60–80 mole % ethylene, having no more than 1.3 wt. % of a polymer fraction which is insoluble in normal decane at 55° C. as an oil additive. Minimization of this decane-insoluble fraction in the polymer reduces the tendency of the polymer to form haze in the oil, which haze is evidence of low temperature instability probably caused by adverse interaction with pour depressant additives. The $\overline{M}_w/\overline{M}_n$ of these copolymers is "surprisingly narrow" and is less than about 4.0, preferably less than 2.6, e.g., 2.2.

BRIEF DESCRIPTION OF THE DRAWINGS

The accompanying drawings depict, for illustration purposes only, processes embodied by the present invention, wherein:

FIG. 9 is a schematic representation of a process for producing polymer in accordance with the present invention, FIG. 2 schematically illustrates how the process depicted in FIG. 1 can be integrated into a lube oil additive process.

DETAILED DESCRIPTION OF THE INVENTION

Figure 1:
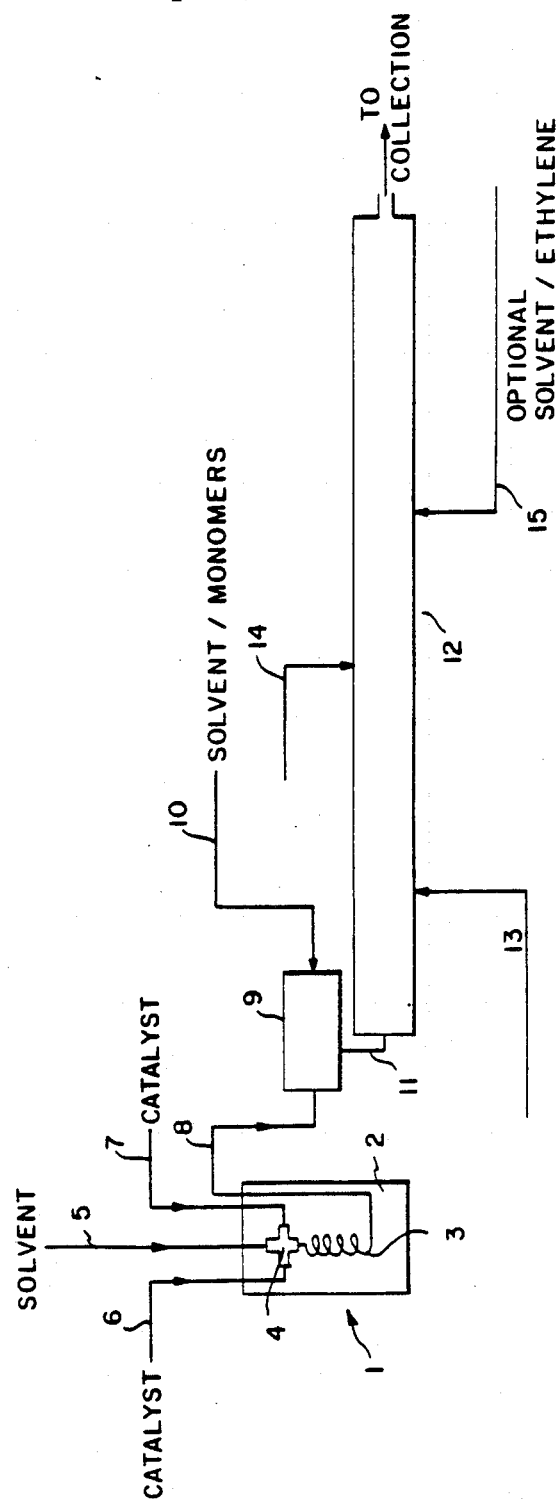

As already noted above, the present invention is drawn to novel copolymer of ethylene and at least one other alpha-olefin monomer which copolymer is intramolecularly heterogeneous and intermolecularly homogeneous and has an MWD characterized by at least one of $\overline{M}_w/\overline{M}_n$ of less than 2 and $\overline{M}_z/\overline{M}_w$ of less than 1.8. More specifically, copolymer in accordance with the present invention comprises intramolecularly heterogeneous chains wherein at least two portions of an individual intramolecularly heterogeneous chain, each portion comprising at least 5 weight percent of the chain, differ in composition from one another by at least 5 weight percent ethylene, wherein the intermolecular compositional dispersity of the polymer is such that 95 wt. % of the polymer chains have a composition 15% or less different in ethylene from the average weight percent ethylene composition, and wherein the copolymer is characterized by at least one of a ratio of $\overline{M}_w/\overline{M}_n$ of less than 2 and a ratio of $\overline{M}_z/\overline{M}_w$ of less than 1.8.

Since the present invention is considered to be most preferred in the context of ethylene-propylene (EPM) or ethylene-propylene-diene (EPDM) copolymers, it will be described in detail in the context of EPM and/or EPDM.

Copolymer in accordance with the present invention is preferably made in a tubular reactor. When produced in a tubular reactor with monomer feed only at the tube inlet, it is known that at the beginning of the tubular reactor ethylene, due to its high reactivity, will be preferentially polymerized. However, the concentration of monomers changes along the tube in favor of propylene as the ethylene is depleted. The result is copolymer chains which are higher in ethylene concentration in the chain segments grown near the reactor inlet (as defined at the point at which the polymerization reaction commences), and higher in propylene concentration in the chain segments formed near the reactor outlet. An illustrative copolymer chain of ethylene-propylene is schematically presented below with E representing ethylene constituents and P representing propylene constituents in the chain:

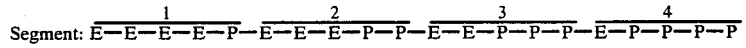

Segment: E—E—E—E—P—E—E—E—P—P—E—E—P—P—P—E—P—P—P—P

As can be seen from this illustrative schematic chain, the far left-hand segment (1) thereof represents that portion of the chain formed at the reactor inlet where the reaction mixture is proportionately richer in the more reactive constituent ethylene. This segment comprises four ethylene molecules and one propylene molecule. However, as subsequent segments are formed from left to right with the more reactive ethylene being depleted and the reaction mixture proportionately increasing in propylene concentration, the subsequent chain segments become more concentrated in propylene. The resulting chain is intramolecularly heterogeneous.

In the event that more than two monomers are used, e.g., in the production of EPDM using a diene termonomer, for purposes of describing the present invention all properties related to homogeneity and heterogeneity will refer to the relative ratio of ethylene to the other monomers in the chain. The property, of the copolymer discussed herein, related to intramolecular compositional dispersity (compositional variation within a chain) shall be referred to as Intra-CD, and that related to intermolecular compositional dispersity (compositional variation between chains) shall be referred to as Inter-CD.

For copolymers in accordance with the present invention, composition can vary between chains as well as along the length of the chain. An object of this invention is to minimize the amount of interchain variation. The Inter-CD can be characterized by the difference in composition between some fraction of the copolymer and the average composition, as well as by the total difference in composition between the copolymer fractions containing the highest and lowest quantity of ethylene. Techniques for measuring the breadth of the Inter-CD are known as illustrated by Junghanns et al wherein a p-xylene-dimethylformamide solvent/non-solvent was used to fractionate copolymer into fractions of differing intermolecular composition. Other solvent/non-solvent systems can be used such as hexane-2-propanol, as will be discussed in more detail below.

The Inter-CD of copolymer in accordance with the present invention is such that 95 wt. % of the copolymer chains have an ethylene composition that differs from the average weight percent ethylene composition by 15 wt. % or less. The preferred Inter-CD is about 13% or less, with the most preferred being about 10% or less. In comparison, Junghanns et al found that their tubular reactor copolymer had an Inter-CD of greater than 15 weight %.

Broadly, the Intra-CD of copolymer in accordance with the present invention is such that at least two portions of an individual intramolecularly heterogeneous chain, each portion comprising at least 5 weight percent of the chain, differ in composition from one another by at least 5 weight percent ethylene. Unless otherwise indicated, this property of Intra-CD as referred to herein is based upon at least two 5 weight percent portions of copolymer chain. The Intra-CD of copolymer in accordance with the present invention can be such that at least two portions of copolymer chain differ by at least 10 weight percent ethylene. Differences of at least 20 weight percent, as well as, of at least 40 weight percent ethylene are also considered to be in accordance with the present invention.

The experimental procedure for determining Intra-CD is as follows. First the Inter-CD is established as described below, then the polymer chain is broken into fragments along its contour and the Inter-CD of the fragments is determined. The difference in the two results is due to Intra-CD as can be seen in the illustrative example below.

Consider a heterogeneous sample polymer containing 30 monomer units. It consists of 3 molecules designated A, B, C.

| A | EEEEPEEEPEEEPPEEPPEPPPEPPPPPPP |
|---|---|
| B | EEEEPEEEPEEEPPEEEPPPEPPPEEPPP |
| C | EEPEEEPEEEPEEEPEEEPPEEPPPEEPPP |

Molecule A is 36.8 wt. % ethylene, B is 46.6%, and C is 50% ethylene. The average ethylene content for the mixture is 44.3%. For this sample the Inter-CD is such that the highest ethylene polymer contains 5.7% more ethylene than the average while the lowest ethylene content polymer contains 7.5% less ethylene than the average. Or, in other words, 100 weight % of the polymer is within +5.7% and −7.5% ethylene about an average of 44.3%. Accordingly, the Inter-CD is 7.5% when the given weight % of the polymer is 100%. The distribution may be represented graphically as by curve 1 in FIG. 3.

If the chains are broken into fragments, there will be new Inter-CD. For simplicity, consider first breaking only molecule A into fragments shown by the slashes as follows:

EEEEP/EEEPE/EEPPE/EPPEP/-
PPEPP/PPPPP

Figure 3:
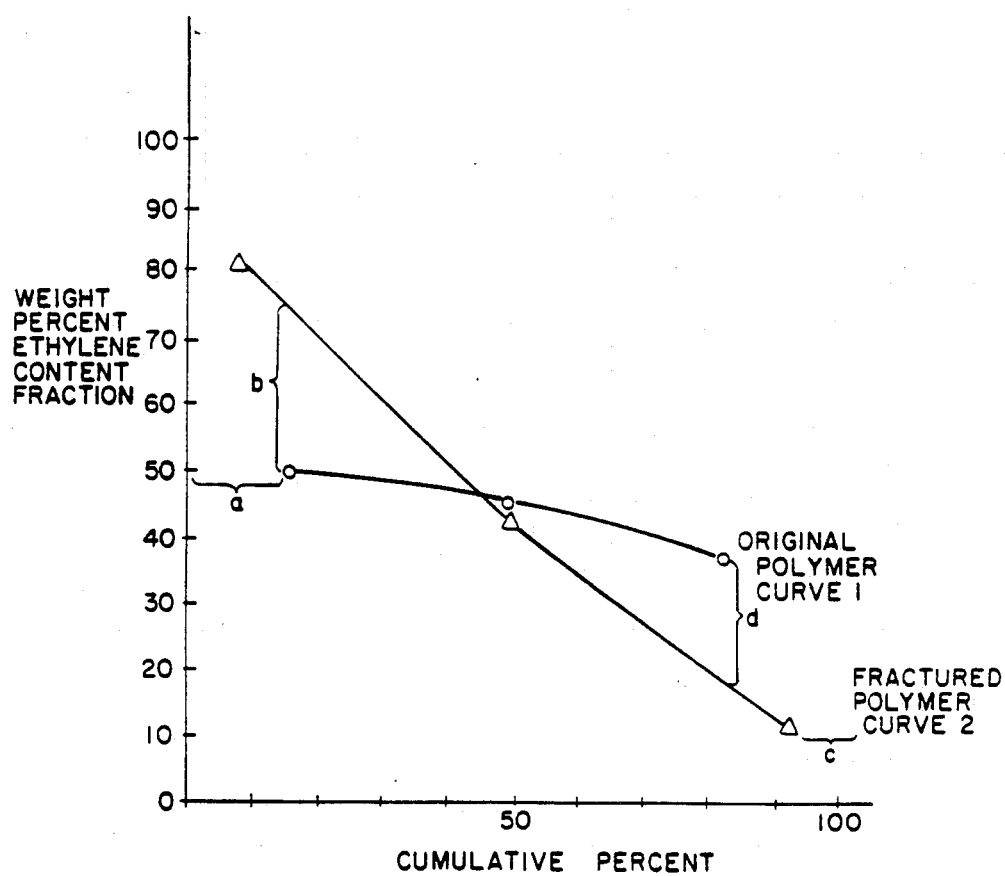
FIG. 3 is a graphical illustration of a technique for determining Intra-CD of a copolymer, FIG. 4 graphically illustrates various copolymer structures that can be attained using processes in accordance with the present invention.

Portions of 72.7%, 72.7%, 50%, 30.8%, 14.3% and 0% ethylene are obtained. If molecules B and C are similarly broken and the weight fractions of similar composition are grouped the new Inter-CD shown by curve 2 in FIG. 3 is obtained. The difference between the two curves in the figure is due to Intra-CD.

Consideration of such data, especially near the end point ranges, demonstrates that for this sample at least 5% of the chain contour represented by the cumulative weight % range (a) differs in composition from another section by at least 15% ethylene shown as (b), the difference between the two curves. The difference in composition represented by (b) cannot be intermolecular. If it were, the separation process for the original polymer would have revealed the higher ethylene contents seen only for the degraded chain.

The compositional differences shown by (b) and (d) in the figure between original and fragmented chains give minimum values for Intra-CD. The Intra-CD must be at least that great, for chain sections have been isolated which are the given difference in composition (b) or (d) from the highest or lowest composition polymer isolated from the original. We know in this example that the original polymer represented at (b) had sections of 72.7% ethylene and 0% ethylene in the same chain. It is highly likely that due to the inefficiency of the fractionation process any real polymer with Intra-CD examined will have sections of lower or higher ethylene connected along its contour than that shown by the end points of the fractionation of the original polymer. Thus, this procedure determines a lower bound for Intra-CD. To enhance the detection, the original whole polymer can be fractionated (e.g., separate molecule A from molecule B from molecule C in the hypothetical example) with these fractions refractionated until they show no (or less) Inter-CD. Subsequent fragmentation of this intermolecularly homogeneous fraction now reveals the total Intra-CD. In principle, for the example, if molecule A were isolated, fragmented, fractionated and analyzed, the Intra-CD for the chain sections would be 72.7−0%=72.7% rather than 72.7−50%=22.7% seen by fractionating the whole mixture of molecules A, B, and C.

In order to determine the fraction of a polymer which is intramolecularly heterogeneous in a mixture of polymers combined from several sources the mixture must be separated into fractions which show no further heterogenity upon subsequent fractionation. These fractions are subsequently fractured and fractionated to reveal which are heterogeneous.

The fragments into which the original polymer is broken should be large enough to avoid end effects and to give a reasonable opportunity for the normal statistical distribution of segments to form over a given monomer conversion range in the polymerization. Intervals of ca 5 weight % of the polymer are convenient. For example, at an average polymer molecular weight of about 105, fragments of ca 5000 molecular weight are appropriate. A detailed mathematical analysis of plug flow or batch polymerization indicates that the rate of change of composition along the polymer chain contour will be most severe at high ethylene conversion near the end of the polymerization. The shortest fragments are needed here to show the low ethylene content sections.

The best available technique for determination of compositional dispersity for non-polar polymers is solvent/non-solvent fractionation which is based on the thermodynamics of phase separation. This technique is described in "Polymer Fractionation", M. Cantow editor, Academic 1967, p.341 ff and in H. Inagaki, T. Tanaku, *Developments in Polymer Characterization*, 3, 1 (1982). These are incorporated herein by reference.

For non-crystalline copolymers of ethylene and propylene, molecular weight governs insolubility more than does composition in a solvent/non-solvent solution. High molecular weight polymer is less soluble in a given solvent mix. Also, there is a systematic correlation of molecular weight with ethylene content for the polymers described herein. Since ethylene polymerizes much more rapidly than propylene, high ethylene polymer also tends to be high in molecular weight. Additionally, chains rich in ethylene tend to be less soluble in hydrocarbon/polar non-solvent mixtures than propylene-rich chains. Thus the high molecular weight, high ethylene chains are easily separated on the basis of thermodynamics.

A fractionation procedure is as follows: Unfragmented polymer is dissolved in n-hexane at 23° C. to form ca a 1% solution (1 g polymer/100 cc hexane). Isopropyl alcohol is titrated into the solution until turbidity appears at which time the precipitate is allowed to settle. The supernatant liquid is removed and the precipitate is dried by pressing between Mylar ® (polyethylene terphthalate) film at 150° C. Ethylene content is determined by ASTM method D-3900. Titration is resumed and subsequent fractions are recovered and analyzed until 100% of the polymer is collected. The titrations are ideally controlled to produce fractions of 5-10% by weight of the original polymer especially at the extremes of composition.

To demonstrate the breadth of the distribution, the data are plotted as % ethylene versus the cumulative weight of polymer as defined by the sum of half the weight % of the fraction of that composition plus the total weight % of the previously collected fractions.

Another portion of the original polymer is broken into fragments. A suitable method for doing this is by thermal degradation according to the following procedure: In a sealed container in a nitrogen-purged oven, a 2 mm thick layer of the polymer is heated for 60 minutes at 330° C. This should be adequate to reduce a 105 molecular weight polymer to fragments of ca 5000 molecular weight. Such degradation does not change the average ethylene content of the polymer. This polymer is fractionated by the same procedure as the high molecular weight precursor. Ethylene content is measured, as well as molecular weight on selected fractions.

Ethylene content is measured by ASTM-D3900 for ethylene-propylene-copolymers between 35 and 85 wt. % ethylene. Above 85% ASTM-D2238 can be used to obtain methyl group concentrations which are related to percent ethylene in an unambiguous manner for ethylene-propylene copolymers. When comonomers other than propylene are employed no ASTM tests covering a wide range of ethylene contents are available, however, proton and carbon 13 nuclear magnetic resonance can be employed to determine the composition of such polymers. These are absolute techniques requiring no calibration when operated such that all nucleii contribute equally to the spectra. For ranges not covered by the ASTM tests for ethylene-propylene copolymers, these nuclear magnetic resonance methods can also be used.

Molecular weight and molecular weight distribution are measured using a Waters 150 gel permeation chromatograph equipped with a Chromatix KMX-6 on-line light scattering photometer. The system is used at 135° C. with 1,2,4 trichlorobenzene as mobile phase. Showdex (Showa-Denko America, Inc.) polystyrene gel columns 802, 803, 804 and 805 are used. This technique is discussed in "Liquid Chromatography of Polymers and Related Materials III", J. Cazes editor. Marcel Dekker, 1981, p. 207 (incorporated herein by reference). No corrections for column spreading are employed; however, data on generally accepted standards, e.g., National Bureau of Standards Polyethene 1484 and anionically produced hydrogenated polyisoprenes (an alternating ethylene-propylene copolymer) demonstrate that such corrections on $\overline{M}_w/\overline{M}_n$ or $\overline{M}_z/\overline{M}_w$ are less than 0.05 unit. $\overline{M}_w/\overline{M}_n$ is calculated from an elution time-molecular weight relationship whereas $\overline{M}_z/\overline{M}_w$ is evaluated using the light scattering photometer. The numerical analyses can be performed using the commercially available computer software GPC2, MOLWT2 available from LDC/Milton Roy-Riviera Beach, Fla.

As-already noted, copolymers in accordance with the present invention are comprised of ethylene and at least one other alpha-olefin. It is believed that such alpha-olefins could include those containing 3 to 18 carbon atoms, e.g., propylene, butene-1, pentene-1, etc. Alpha-olefins of 3 to 6 carbons are preferred due to economic considerations. The most preferred copolymers in accordance with the present invention are those comprised of ethylene and propylene or ethylene, propylene and diene.

As is well known to those skilled in the art, copolymers of ethylene and higher alpha-olefins such as propylene often include other polymerizable monomers. Typical of these other monomers may be non-conjugated dienes such as the following non-limiting examples:

a. straight chain acyclic dienes such as: 1,4hexadiene; 1,6-octadiene;

b. branched chain acyclic dienes such as: 5-methyl-1,4-hexadiene; 3,7-dimethyl-1,6-octadiene; 3,7-dimethyl-1,7-octadiene and the mixed isomers of dihydro-myrcene and dihydroocinene;

c. single ring alicyclic dienes such as: 1,4-cyclohexadiene; 1,5-cyclooctadiene; and 1,5-cyclododecadiene;

d. multi-ring alicyclic fused and bridged ring dienes such as: tetrahydroindene; methyltetrahydroindene; dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene (ENB), 5-propyl-2-norbornene, 5-isopropylidene-2-norbornene, 5-(4-cyclopentenyl)-2-norbornene; 5-cyclohexylidene-2-norbornene.

Of the non-conjugated dienes typically used to prepare these copolymers, dienes containing at least one of the double bonds in a strained ring are preferred. The most preferred diene is 5-ethylidene-2-norbornene (ENB). The amount of diene (wt. basis) in the copolymer could be from about 0% to 20% with 0% to 15% being preferred. The most preferred range is 0% to 10%.

As already noted, the most preferred copolymer in accordance with the present invention is ethylene-propylene or ethylene-propylene-diene. In either event, the average ethylene content of the copolymer could be as low as about 10% on a weight basis. The preferred minimum is about 25%. A more preferred minimum is about 30%. The maximum ethylene content could be about 90% on a weight basis. The preferred maximum is about 85%, with the most preferred being about 80%.

The molecular weight of copolymer made in accordance with the present invention can vary over a wide range. It is believed that the weight average molecular weight could be as low as about 2,000. The preferred minimum is about 10,000. The most preferred minimum is about 20,000. It is believed that the maximum weight average molecular weight could be as high as about 12,000,000. The preferred maximum is about 1,000,000. The most preferred maximum is about 750,000.

Another feature of copolymer made in accordance with the present invention is that the molecular weight distribution (MWD) is very narrow, as characterized by at least one of a ratio of $\overline{M}_w/\overline{M}_n$ of less than 2 and a ratio of $\overline{M}_z/\overline{M}_w$ of less than 1.8. As relates to EPM and EPDM, some typical advantages of such copolymers having narrow MWD are greater resistance to shear degradation, and when compounded and vulcanized, faster cure and better physical properties than broader MWD materials. Particularly for oil additive applications, the preferred copolymers have $\overline{M}_w/\overline{M}_n$ less than about 1.6, with less than about 1.4 being most preferred. The preferred $\overline{M}_z/\overline{M}_w$ is less than about 1.5, with less than about 1.3 being most preferred.

Processes in accordance with the present invention produce copolymer by polymerization of a reaction mixture comprised of catalyst, ethylene and at least one additional alpha-olefin monomer. Solution polymerizations are preferred.

Any known solvent for the reaction mixture that is effective for the purpose can be used in conducting solution polymerizations in accordance with the present invention. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight 11 chain or branched chain hydrocarbons, particularly hexane. Nonlimiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

These processes are carried out in a mix-free reactor system, which is one in which substantially no mixing occurs between portions of the reaction mixture that contain polymer chains initiated at different times. Suitable reactors are a continuous flow tubular or a stirred batch reactor. A tubular reactor is well known and is designed to minimize mixing of the reactants in the direction of flow. As a result, reactant concentration will vary along the reactor length. In contrast, the reaction mixture in a continuous flow stirred tank reactor (CFSTR) is blended with the incoming feed to produce a solution of essentially uniform composition everywhere in the reactor. Consequently, the growing chains in a portion of the reaction mixture will have a variety of ages and thus a single CFSTR is not suitable for the process of this invention. However, it is well known that 3 or more stirred tanks in series with all of the catalyst fed to the first reactor can approximate the performance of a tubular reactor. Accordingly, such tanks in series are considered to be in accordance with the present invention.

A batch reactor is a suitable vessel, preferably equipped with adequate agitation, to which the catalyst, solvent, and monomer are added at the start of the polymerization. The charge of reactants is then left to polymerize for a time long enough to produce the desired product. For economic reasons, a tubular reactor is preferred to a batch reactor for carrying out the processes of this invention.

In addition to the importance of the reactor system to make copolymers in accordance with the present invention, the polymerization should be conducted such that:

a. the catalyst system produces essentially one active catalyst species, b. the reaction mixture is essentially free of chain transfer agents, and c. the polymer-chains are essentially all initiated simultaneously, which is at the same time for a batch reactor or at the same point along the length of the tube for a tubular reactor.

The desired polymer can be obtained if additional solvent and reactants (e.g., at least one of the ethylene, alpha-olefin and diene) are added either along the length of a tubular reactor or during the course of polymerization in a batch reactor. Operating in this fashion may be desirable in certain circumstances to control the polymerization rate or polymer composition. However, it is necessary to add essentially all of the catalyst at the inlet of the tube or at the onset of batch reactor operation to meet the requirement that essentially all polymer chains are initiated simultaneously.

Accordingly, processes in accordance with the present invention are carried out:

(a) in at least one mix-free reactor, (b) using a catalyst system that produces essentially one active catalyst species, (c) using at least one reaction mixture which is essentially transfer agent-free, and (d) in such a manner and under conditions sufficient to initiate propagation of essentially all polymer chains simultaneously.

Since the tubular reactor is the preferred reactor system for carrying out processes in accordance with the present invention, the following illustrative descriptions and examples are drawn to that system, but will apply to other reactor systems as will readily occur to the artisan having the benefit of the present disclosure.

In practicing processes in accordance with the present invention, use is preferably made of at least one tubular reactor. Thus, in its simplest form, such a process would make use of but a single reactor. However, as would readily occur to the artisan having the benefit of the present disclosure, more than one reactor could be used, either in parallel for economic reasons, or in series with multiple monomer feed to vary intramolecular composition.

Figure 4:
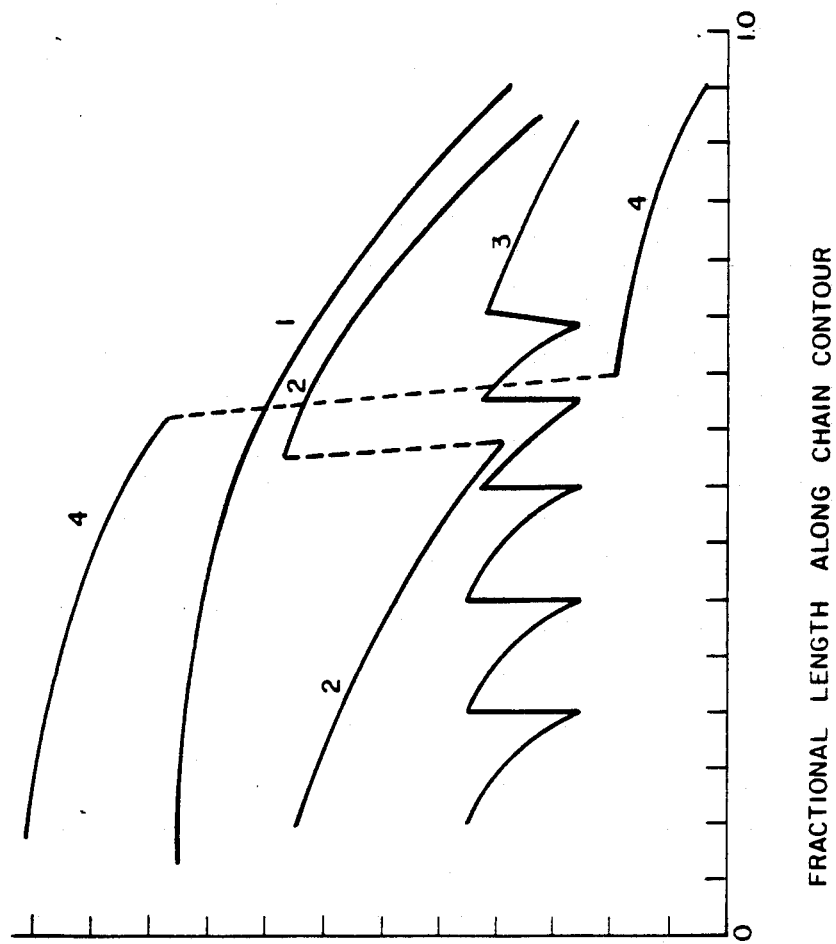

For example, various structures can be prepared by adding additional monomer(s) during the course of the polymerization, as shown in FIG. 4, wherein composition is plotted versus position along the contour length of the chain. The Intra-CD of curve 1 is obtained by feeding all of the monomers at the tubular reactor inlet or at the start of a batch reaction. In comparison, the Intra-CD of curve 2 can be made by adding additional ethylene at a point along the tube or, in a batch reactor, where the chains have reached about half their length. The Intra-CD's of Curve 3 requires multiple feed additions. The Intra-CD of curve 4 can be formed if additional comonomer rather than ethylene is added. This structure permits a whole ethylene composition range to be omitted from the chain. In each case, a third or more comonomers may be added.

The composition of the catalyst used to produce alpha-olefin copolymers has a profound effect on copolymer product properties such as compositional dispersity and MWD. The catalyst utilized in practicing processes in accordance with the present invention should be such as to yield essentially one active catalyst species in the reaction mixture. More specifically, it should yield one primary active catalyst species which provides for substantially all of the polymerization reaction. Additional active catalyst species could be present, provided the copolymer product is in accordance with the present invention, e.g., narrow MWD and Inter-CD. It is believed that such additional active catalyst species could provide as much as 35% (weight) of the total copolymer. Preferably, they should account for about 10% or less of the copolymer. Thus, the essentially one active species should provide for at least 65% of the total copolymer produced, preferably for at least 90% thereof. The extent to which a catalyst species contributes to the polymerization can be readily determined using the below-described techniques for characterizing catalyst according to the number of active catalyst species.

Techniques for characterizing catalyst according to the number of active catalyst species are within the skill of the art, as evidenced by an article entitled "Ethylene-Propylene Copolymers. Reactivity Ratios, Evaluation and Significance", C. Cozewith and G. Ver Strate, Macromolecules, 4, 482 (1971), which is incorporated herein by reference.

It is disclosed by the authors that copolymers made in a continuous flow stirred reactor should have an MWD characterized by $\overline{M}_w/\overline{M}_n = 2$ and a narrow Inter-CD when one active catalyst species is present. By a combination of fractionation and gel permeation chromatography (GPC) it is shown that for single active species catalysts the compositions of the fractions vary no more than ±3% about the average and the MWD (weight to number average ratio) for these samples approaches two (2). It is this latter characteristic ($\overline{M}_w/\overline{M}_n$ of about 2) that is deemed the more important in identifying a single active catalyst species. On the other hand, other catalysts gave copolymer with an Inter-CD greater than ±10% about the average and multi-modal MWD often with $\overline{M}_w/\overline{M}_n$ greater than 10. These other catalysts are deemed to have more than one active species.

Catalyst systems to be used in carrying out processes in accordance with the present invention may be Ziegler catalysts, which may typically include:

(a) a compound of a transition metal, i.e., a metal of Groups I-B, III-B, IVB, VB, VIB, VIIB and VIII of the Periodic Table, and (b) an organometal compound of a metal of Groups I-A, II-A, II-B and III-A of the Periodic Table.

The preferred catalyst system in practicing processes in accordance with the present invention comprises hydrocarbon-soluble vanadium compound in which the vanadium valence is 3 to 5 and organo-aluminum compound, with the proviso that the catalyst system yields essentially one active catalyst species as described above. At least one of the vanadium compound/organo-aluminum pair selected must also contain a valence-bonded halogen.

In terms of formulas, vanadium compounds useful in practicing processes in accordance with the present invention could be:

$$VCl_x(OR)_{3-x}, \quad \text{with } \overset{O}{\underset{\|}{V}} \tag{1}$$

where x = 0–3 and R = a hydrocarbon radical;

$VCl_4$;

$VO(AcAc)_2$, where AcAc = acetyl acetonate;

$V(AcAc)_3$;

$$VOCl_x(AcAc)_{3-x}, \tag{2}$$

where x = 1 or 2; and where n=2–3 and B=Lewis base capable of making hydrocarbon-soluble complexes with $VCl_3$, such as tetrahydrofuran, 2-methyl-tetrahydrofuran and dimethyl pyridine.

In formula 1 above, R preferably represents a $C_1$ to $C_{10}$ aliphatic, alicyclic or aromatic hydrocarbon radical such as ethyl (Et), phenyl, isopropyl, butyl, propyl, n-butyl, i-butyl, t-butyl, hexyl, cyclohexyl, octyl, naphthyl, etc. Non-limiting illustrative examples of formula (1) and (2) compounds are vanadyl trihalides, alkoxy halides and alkoxides such as $VOCl_3$, $VOCl_2(OBu)$ where Bu=butyl, and $VO(OC_2H_5)_3$. The most preferred vanadium compounds are $VCl_4$, $VOCl_3$, and $VOCl_2(OR)$.

As already noted, the co-catalyst is preferably organo-aluminum compound. In terms of chemical formulas, these compounds could be as follows:

| | |
|---|---|
| $AlR_3$, | $Al(OR')R_2$ |
| $Al R_2Cl$, | $R_2Al-O-AlR_2$ |
| $AlR'RCl$ | $AlR_2I$ |
| $Al_2R_3Cl_3$, | and |
| $AlRCl_2$, | | where R and R' represent hydrocarbon radicals, the same or different, as described above with respect to the vanadium compound formula. The most preferred organo-aluminum compound is an aluminum alkyl sesquichloride such as $Al_2Et_3Cl_3$ or $Al_2(iBu)_3Cl_3$.

In terms of performance, a catalyst system comprised of $VCl_4$ and $Al_2R_3Cl_3$, preferably where R is ethyl, has been shown to be particularly effective. For best catalyst performance, the molar amounts of catalyst components added to the reaction mixture should provide a molar ratio of aluminum/vanadium (Al/V) of at least about 2. The preferred minimum Al/V is about 4. The maximum Al/V is based primarily on the considerations of catalyst expense and the desire to minimize the amount of chain transfer that may be caused by the organo-aluminum compound (as explained in detail below). Since, as is known certain organo-aluminum compounds act as chain transfer agents, if too much is present in the reaction mixture the $\overline{M}_w/\overline{M}_n$ of the copolymer may rise above 2. Based on these considerations, the maximum Al/V could be about 25, however, a maximum of about 17 is more preferred. The most preferred maximum is about 15.

Chain transfer agents for the Ziegler-catalyzed polymerization of alpha-olefins are well known and are illustrated, by way of example, by hydrogen or diethyl zinc for the production of EPM and EPDM. Such agents are very commonly used to control the molecular weight of EPM and EPDM produced in continuous flow stirred reactors. For the essentially single active species Ziegler catalyst systems used in accordance with the present invention, addition of chain transfer agents to a CFSTR reduces the polymer molecular weight but does not affect the molecular weight distribution. On the other hand, chain transfer reactions during tubular reactor polymerization in accordance with the present invention broaden polymer molecular weight distribution and Inter-CD. Thus the presence of chain transfer agents in the reaction mixture should be minimized or omitted altogether. Although difficult to generalize for all possible reactions, the amount of chain transfer agent used should be limited to those amounts that provide copolymer product in accordance with the desired limits as regards MWD and compositional dispersity. It is believed that the maximum amount of chain transfer agent present in the reaction mixture could be as high as about 0.2 mol/mol of transition metal, e.g., vanadium, again provided that the resulting copolymer product is in accordance with the desired limits as regards MWD and compositional dispersity. Even in the absence of added chain transfer agent, chain transfer reactions can occur because propylene and the organo-aluminum cocatalyst can also act as chain transfer agents. In general, among the organo-aluminum compounds that in combination with the vanadium compound yield just one active species, the organo-aluminum compound that gives the highest copolymer molecular weight at acceptable catalyst activity should be chosen. Furthermore, if the Al/V ratio has an effect on the molecular weight of copolymer product, that Al/V should be used which gives the highest molecular weight also at acceptable catalyst activity. Chain transfer with propylene can best be limited by avoiding excessive temperature during the polymerization as described below.

Molecular weight distribution and Inter-CD are also broadened by catalyst deactivation during the course of the polymerization which leads to termination of growing chains. It is well known that the vanadium-based Ziegler catalysts used in accordance with the present invention are subject to such deactivation reactions which depend to an extent upon the composition of the catalyst. Although the relationship between active catalyst lifetime and catalyst system composition is not known at present, for any given catalyst, deactivation can be reduced by using the shortest residence time and lowest temperature in the reactor that will produce the desired monomer conversions.

Polymerizations in accordance with the present invention should be conducted in such a manner and under conditions sufficient to initiate propagation of essentially all copolymer chains simultaneously. This can be accomplished by utilizing the process steps and conditions described below.

The catalyst components are preferably premixed, that is, reacted to form active catalyst outside of the reactor, to ensure rapid chain initiation. Aging of the premixed catalyst system, that is, the time spent by the catalyst components (e.g., vanadium compound and organo-aluminum) in each other's presence outside of the reactor, should preferably be kept within limits. If not aged for a sufficient period of time, the components will not have reacted with each other sufficiently to yield an adequate quantity of active catalyst species, with the result of nonsimultaneous chain initiation. Also, it is known that the activity of the catalyst species will decrease with time so that the aging must be kept below a maximum limit. It is believed that the minimum aging period, depending on such factors as concentration of catalyst components, temperature and mixing equipment, could be as low as about 0.1 second. The preferred minimum aging period is about 0.5 second, while the most preferred minimum aging period is about 1 second. While the maximum aging period could be higher, for the preferred vanadium/organo-aluminum catalyst system the preferred maximum is about 200 seconds. A more preferred maximum is about 100 seconds. The most preferred maximum aging period is about 50 seconds. The premixing could be performed at low temperature such as 40° C. or below. It is preferred that the premixing be performed at 25° C. or below, with 15° C. or below being most preferred.

The temperature of the reaction mixture should also be kept within certain limits. The temperature at the reactor inlet should be high enough to provide complete, rapid chain initiation at the start of the polymerization reaction. The length of time the reaction mixture spends at high temperature must be short enough to minimize the amount of undesirable chain transfer and catalyst deactivation reactions.

Temperature control of the reaction mixture is complicated somewhat by the fact that the polymerization reaction generates large quantities of heat. This problem is, preferably, taken care of by using prechilled feed to the reactor to absorb the heat of polymerization. With this technique, the reactor is operated adiabatically and the temperature is allowed to increase during the course of polymerization. As an alternative to feed prechill, heat can be removed from the reaction mixture, for example, by a heat exchanger surrounding at least a portion of the reactor or by well-known autorefrigeration techniques in the case of batch reactors or multiple stirred reactors in series.

If adiabatic reactor operation is used, the inlet temperature of the reactor feed could be about from −50° C. to 150° C. It is believed that the outlet temperature of the reaction mixture could be as high as about 200° C. The preferred maximum outlet temperature is about 70° C. The most preferred maximum is about 50° C. In the absence of reactor cooling, such as by a cooling jacket, to remove the heat of polymerization, it has been determined that the temperature of the reaction mixture will increase from reactor inlet to outlet by about 13° C. per weight percent of copolymer in the reaction mixture (weight of copolymer per weight of solvent).

Having the benefit of the above disclosure, it would be well within the skill of the art to determine the operating temperature conditions for making copolymer in accordance with the present invention. For example, assume an adiabatic reactor and an outlet temperature of 35° C. are desired for a reaction mixture containing 5% copolymer. The reaction mixture will increase in temperature by about 13° C. for each weight percent copolymer or 5 weight percent×13° C./wt. %=65° C. To maintain an outlet temperature of 35° C., it will thus require a feed that has been prechilled to 35° C.−65° C.=−30° C. In the instance that external cooling is used to absorb the heat of polymerization, the feed inlet temperature could be higher with the other temperature constraints described above otherwise being applicable.

Because of heat removal and reactor temperature limitations, the preferred maximum copolymer concentration at the reactor outlet is 25 wt./100 wt. diluent. The most preferred maximum concentration is 15 wt/100 wt. There is no lower limit to concentration due to reactor operability, but for economic reasons it is preferred to have a copolymer concentration of at least 2 wt/100 wt. Most preferred is a concentration of at least 3 wt/100 wt.

The rate of flow of the reaction mixture through the reactor should be high enough to provide good mixing of the reactants in the radial direction and minimize mixing in the axial direction. Good radial mixing is beneficial not only to both the Intra-and Inter-CD of the copolymer chains but also to minimize radial temperature gradients due to the heat generated by the polymerization reaction. Radial temperature gradients will tend to broaden the molecular weight distribution of the copolymer since the polymerization rate is faster in the high temperature regions resulting from poor heat dissipation. The artisan will recognize that achievement of these objectives is difficult in the case of highly viscous solutions. This problem can be overcome to some extent through the use of radial mixing devices such as static mixers (e.g., those produced by the Kenics Corporation).

It is believed that residence time of the reaction mixture in the mix-free reactor can vary over a wide range. It is believed that the minimum could be as low as about 1 second. A preferred minimum is about 10 seconds. The most preferred minimum is about 15 seconds. It is believed that the maximum could be as high as about 3600 seconds. A preferred maximum is about 1800 seconds. The most preferred maximum is about 900 seconds.

With reference to the accompanying drawings, particularly FIG. 1, reference numeral 1 generally refers to a premixing device for premixing the catalyst components. For purposes of illustration, it is assumed that a copolymer of ethylene and propylene (EPM) is to be produced using as catalyst components vanadium tetrachloride and ethyl aluminum sesqui chloride. The polymerization is an adiabatic, solution polymerization process using hexane solvent for both the catalyst system and the reaction mixture.

The premixing device 1 comprises a temperature control bath 2, a fluid flow conduit 3 and mixing device 4 (e.g., a mixing tee). To mixing device 4 are fed hexane solvent, vanadium tetrachloride and ethyl aluminum sesqui chloride through feed conduits 5, 6 and 7, respectively. Upon being mixed in mixing device 4, the resulting catalyst mixture is caused to flow within conduit 3, optionally in the form of a coiled tube, for a time long enough to produce the active catalyst species at the temperature set by the temperature bath. The temperature of the bath is set to give the desired catalyst solution temperature in conduit 3 at the outlet of the bath.

Upon leaving the premixing device, the catalyst solution flows through conduit 8 into mixing zone 9 to provide an intimate mixing with hexane solvent and reactants (ethylene and propylene) which are fed through conduit 10. Any suitable mixing device can be used, such as mechanical mixer, orifice mixer or mixing tee. For economic reasons, the mixing tee is preferred. The residence time of the reaction mixture in mixing zone 9 is kept short enough to prevent significant polymer formation therein before being fed through conduit 11 to tubular reactor 12. Alternatively, streams 8 and 10 can be fed directly to the inlet of reactor 12 if the flow rates are high enough to accomplish the desired level of intimate mixing. The hexane with dissolved monomers may be cooled upstream of mixing zone 9 to provide the desired feed temperature at the reactor inlet.

Tubular reactor 12 is shown with optional, intermediate feed points 13–15 where additional monomers (e.g., ethylene as shown) and/or hexane can be fed to the reactor. The optional feeds would be used in the instance where it would be desirable to control the Intra-CD. While the reactor can be operated adiabatically, if desired or necessary to maintain reaction mixture temperature within desired limits, external cooling means such as a cooling jacket surrounding at least a portion of the reactor system 12 can be provided.

Figure 2:
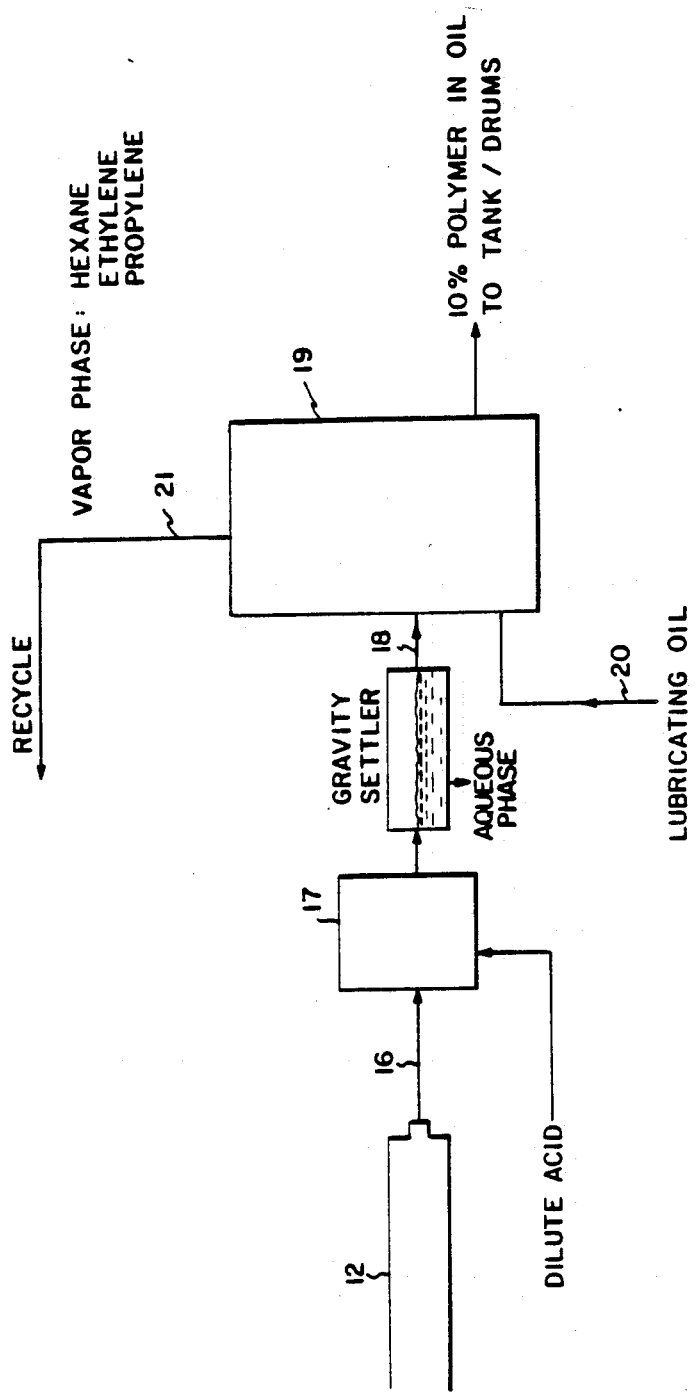

With reference to FIG. 2 which schematically illustrates a process for mixing copolymer with lube oil, copolymer product from reactor 12 is fed through conduit 16 to deashing section 17 wherein catalyst residues are removed from the reaction mixture in a known manner (known as deashing). The vanadium and aluminum compound residues are removed by reacting them with water to form hydrocarbon-insoluble hydroxides and then extracting the hydroxides into dilute acid.

After separating the aqueous and hydrocarbon phases, for instance in a gravity settler, the polymer solution, which primarily contains solvent, unreacted monomers and copolymer product (EPM) is fed through conduit 18 to lube oil mixing tank 19. Of course, tank 19 could be a staged series of tanks. Hot lube oil is fed through conduit 20 to mixing tank 19, wherein the remaining reaction mixture is heated up such that the remaining hexane and unreacted monomers are vaporized and removed through recycle conduit 21 through which they flow back for reuse in premixing device 1 following suitable purification to remove any catalyst poisons. The copolymer product, being hydrocarbon-soluble, is now present in the lube oil and is removed from tank 19 as a copolymer-in-oil solution.

Alternatively, the copolymer solution from the gravity settler can be steam distilled with subsequent extrusion drying of the polymer and then mixed with a hydrocarbon mineral oil diluent to produce an oil additive concentrate or lube oil additive.

Having thus described the above illustrative reactor system, it will readily occur to the artisan that many variations can be made within the scope of the present invention. For example, the placement and number of multiple feed sites, the choice of temperature profile during polymerization and the concentrations of reactants can be varied to suit the end-use application.

By practicing processes in accordance with the present invention, alpha-olefin copolymers having very narrow MWD can be made by direct polymerization. Although narrow MWD copolymers can be made using other known techniques, such as by fractionation or mechanical degradation, these techniques are considered to be impractical to the extent of being unsuitable for commercial-scale operation. As regards EPDM made in accordance with the present invention, the products have enhanced cure properties at a given Mooney Viscosity. As regards EPM, the products have good shear stability and excellent low temperature properties which make them especially suitable for lube oil applications. For lube oil applications, the narrower the MWD of the polymer, the better the copolymer is considered to be.

A lubricating oil composition in accordance with the present invention comprises a major amount of basestock lubricating oil (lube oil) of lubricating viscosity which contains an effective amount of viscosity index improver being a copolymer of ethylene and at least one other alphaolefin as described in detail above. More specifically, the copolymer should have a MWD characterized by at least one of a ratio of $\overline{M}_w/\overline{M}_n$ of less than 2 and a ratio of $\overline{M}_z/\overline{M}_w$ of less than 1.8. The preferred ratio of is less than about 1.6, with less than about 1.4 being preferred. The preferred $\overline{M}_z/\overline{M}_w$ is less than about 1.5, with less than about 1.3 being most preferred.

It is preferred that the Intra-CD of the copolymer is such that at least two portions of an individual intramolecularly heterogeneous chain, each portion comprising at least 5 weight percent of said chain, differ in composition from one another by at least 5 weight percent ethylene. The Intra-CD can be such that at least two portions of copolymer chain differ by at least 10 weight percent ethylene. Differences of at least 20 weight percent, as well as, 40 weight percent ethylene are also considered to be in accordance with the present invention.

It is also preferred that the Inter-CD of the copolymer is such that 95 wt. % of the copolymer chains have an ethylene composition that differs from the copolymer average weight percent ethylene composition by 15 wt. % or less. The preferred Inter-CD is about 13% or less, with the most preferred being about 10% or less.

In a most preferred embodiment, the copolymer has all of the MWD, Intra-CD and Inter-CD characteristics described above when incorporated in a lubricating oil or oil additive concentrate composition. In current practice, ethylene-propylene copolymer is most preferred. The preferred ethylene content of the copolymer, on a weight basis, for use as a lube oil additive is about from 30% to 75%.

For lube oil additive applications, it is believed that the copolymer could have a weight average molecular weight as low as about 5,000. The preferred minimum is about 15,000, with about 50,000 being the most preferred minimum. <It is believed that the maximum weight average molecular weight could be as high as about 500,000. The preferred maximum is about 300,000, with about 250,000 being the most preferred maximum.

Copolymers of this invention may be employed in lubricating oils as viscosity index improvers cr viscosity modifiers in amounts varying broadly from about 0.001 to 49 wt. % . The proportions giving the best results will vary somewhat according to the nature of the lubricating oil basestock and the specific purpose for which the lubricant is to serve in a given case. When used as lubricating oils for diesel or gasoline engine crankcase lubricants, the polymer concentrations are within the range of about 0.1 to 15.0 wt % of the total composition which are amounts effective to provide viscosity index improvements. Typically such polymeric additives are sold as oil additive concentrates wherein the additive is present in amounts of about 5 to 50 wt %, preferably 6 to 25 wt % based on the total amount of hydrocarbon mineral oil diluent for the additive. The polymers of this invention are typically used in lubricating oils based on a hydrocarbon mineral oil having a viscosity of about 2–40 centistokes (ASTM D-445) at 99° C., but lubricating oil basestocks comprised of a mixture of a hydrocarbon mineral oil and up to about 25 wt % of a synthetic lubricating oil such as esters of dibasic acids and complex esters derived from monobasic acids, polyglycols, dibasic acids and alcohols are also considered suitable.

Finished lubricating oils containing the ethylene-alpha-olefin polymers of the present invention will typically contain a number of other conventional additives in amounts required to provide their normal attendant functions and these include ashless dispersants, metal or over-based metal detergent additives, zinc dihydrocarbyl dithiophosphate, anti-wear additives, anti-oxidants, pour depressants, rust inhibitors, fuel economy or friction reducing additives and the like.

The ashless dispersants include the polyalkenyl or borated polyalkenyl succinimide where the alkenyl group is derived from a $C_3$-$C_4$ olefin, especially polyisobutenyl having a number average molecular weight of about 700 to 5,000. Other well known dispersants include the oil soluble polyol esters of hydrocarbon substituted succinic anhydride, e.g., polyisobutenyl succinic anhydride and the oil soluble oxazoline and lactone oxazoline dispersants derived from hydrocarbon substituted succinic anhydride and di-substituted amino alcohols. Lubricating oils typically contain about 0.5 to 5 wt. % of ashless dispersant.

The metal detergent additives suitable in the oil are known in the art and include one or more members selected from the group consisting of overbased oil-soluble calcium, magnesium and barium phenates, sulfurized phenates, and sulfonates especially the sulfonates of $C_{16}$-$C_{50}$ alkyl substituted benzene or toluene sulfonic acids which have a total base number of about 80 to 300. These overbased materials may be used as the sole metal detergent additive or in combination with the same additives in the neutral form but the overall metal detergent additive combination should have a basicity as represented by the foregoing total base number. Preferably they are present in amounts of from about 0.5 to 8 wt. % with a mixture of overbased magnesium sulfurized phenate and neutral calcium sulfurized phenate, obtained from $C_8$ to $C_{12}$ alkyl phenols being especially useful.

The anti-wear additives useful are the oil-soluble zinc dihydrocarbyldithiophosphate having a total of at least 5 carbon atoms, preferably alkyl groups of $C_4$-$C_8$, typically used in amounts of about 0.5–6% by weight.

Other suitable conventional viscosity index improvers, or viscosity modifiers, are the olefin polymers such as other ethylene-propylene copolymers (e.g., those disclosed in the prior art as discussed above), polybutene, hydrogenated polymers and copolymers and terpolymers of styrene with isoprene and/or butadiene, polymers of alkyl acrylates or alkyl methacrylates, copolymers of alkyl methacrylates with N-vinyl pyrollidone or dimethylaminoalkyl methacrylate, post-grafted polymers of ethylenepropylene with an active monomer such as maleic anhydride which may be further reacted with alcohol or an alkylene polyamine, styrene-maleic anhydride polymers post-reacted with alcohols and amines and the like. These are used as required to provide the viscosity range desired in the finished oil, in accordance with known formulating techniques.

Examples of suitable oxidation inhibitors are hindered phenols, such as 2,6-ditertiary-butyl-paracresol, amines, sulfurized phenols and alkyl phenothiazines; usually a lubricating oil will contain about 0.01 to 3 weight percent of oxidation inhibitor depending on its effectiveness.

Rust inhibitors are employed in very small proportions such as about 0.1 to 1 weight percent with suitable rust inhibitors being exemplified by $C_9$-$C_{30}$ aliphatic succinic acids or anhydrides such as dodecenyl succinic anhydride.

Antifoam agents are typically the polysiloxane silicone polymers present in amounts of about 0.01 to 1 weight percent.

Pour point depressants are used generally in amounts of from about 0.01 to about 10.0 wt. %, more typically from about 0.01 to about 1 wt. %, for most mineral oil basestocks of lubricating viscosity. Illustrative of pour point depressants which are normally used in lubricating oil compositions are polymers and copolymers of n-alkyl methacrylate and n-alkyl acrylates, copolymers of di-n-alkyl fumarate and vinyl acetate, alpha-olefin copolymers, alkylated naphthalenes, copolymers or terpolymers of alpha-olefins and styrene and/or alkyl styrene, styrene dialkyl maleic copolymers and the like.

As noted above, copolymer products made in accordance with the present invention have excellent low temperature properties which makes them suitable for lube oil applications. Accordingly, lube oil compositions made in accordance with the present invention preferably have a Mini Rotary Viscosity (MRV) measurement in centipoises (cps) at $-25°$ C. according to ASTM-D 3829 of less than 30,000. A more preferred MRV is less than 20,000, with less than 10,000 being most preferred.

With reference again to processes for making copolymer in accordance with the present invention, it is well known that certain combinations of vanadium and aluminum compounds that can comprise the catalyst system can cause branching and gelation during the polymerization for polymers containing high levels of diene. To prevent this from happening Lewis bases such as ammonia, tetrahydrofuran, pyridine, tributylamine, tetrahydrothiophene, etc., can be added to the polymerization system using techniques well known to those skilled in the art.

EXAMPLE 1

In this example, an ethylene-propylene copolymer was prepared in a conventional continuous flow stirred tank reactor. Catalyst, monomers and solvent were fed to a 3 gallon reactor at rates shown in the accompanying Table I. Hexane was purified prior to use by passing over 4A molecular sieves (Union Carbide, Linde Div. 4A 1/16" pellets) and silica gel (W. R. Grace Co., Davison Chemical Div., PA-400 20–40 mesh) to remove polar impurities which act as catalyst poisons. Gaseous ethylene and propylene were passed over hot (270° C.) CuO (Harshaw Chemical Co., CU1900 1/4" spheres) to remove oxygen followed by mol sieve treatment for water removal and then were combined with the hexane upstream of the reactor and passed through a chiller which provided a low enough temperature to completely dissolve the monomers in the hexane. Polymerization temperature was controlled by allowing the cold feed to absorb the heat of reaction generated by the polymerization. The reactor outlet pressure was controlled at 413 kPa to ensure dissolution of the monomers and a liquid filled reactor. 0 Catalyst solution was prepared by dissolving 37.4 g of $VCl_4$ in 7 l of purified n-hexane. Cocatalyst consisted of 96.0 g $Al_2Et_3Cl_3$ in 7 l of n-hexane. These solutions were fed to the reactor at rates shown in Table I. For the case of catalyst premixing the two solutions were premixed at 0° C. for 10 seconds prior to entry into the reactor.

Copolymer was deashed by contacting with aqueous base and recovered by steam distillation of the diluent with mill drying of the product to remove residual volatiles. The product so prepared was analyzed for composition, compositional distribution and molecular weight distribution using the techniques discussed in the specification. Results were as in Table I.

The copolymers were essentially compositionally homogeneous with heterogeneity ±3% about the average, i.e. within experimental error.

These results indicate that for copolymer made in a continuous flow stirred reactor the $\overline{M}_w/\overline{M}_n$ was about 2 and the Intra-CD was less than 5% ethylene. Catalyst premixing had no effect on $\overline{M}_w/\overline{M}_n$ or compositional distribution. Experiments over a range of polymerization conditions with the same catalyst system produced polymers of similar structure.

withdrawn from the other end. Monomers were purified and reactor temperature and pressure was controlled as in Example 1.

A catalyst solution was prepared by dissolving 18.5 g of vanadium tetrachloride, $VCl_4$, in 5.0 l of purified n-hexane The cocatalyst consisted of 142 g of ethyl aluminum sesqui chloride, $Al_2Et_3Cl_3$, in 5.0 l of purified n-hexane. In the case of catalyst premixing, the two solutions were premixed at a given temperature (as indicated in TABLE II) for 10 seconds prior to entry into the reactor.

Table II lists the feed rates for the monomers, catalyst, and the residence time of examples 2(A.), (B.), and (C.). Polymer was recovered and analyzed as in Example 1.

Figure 5:
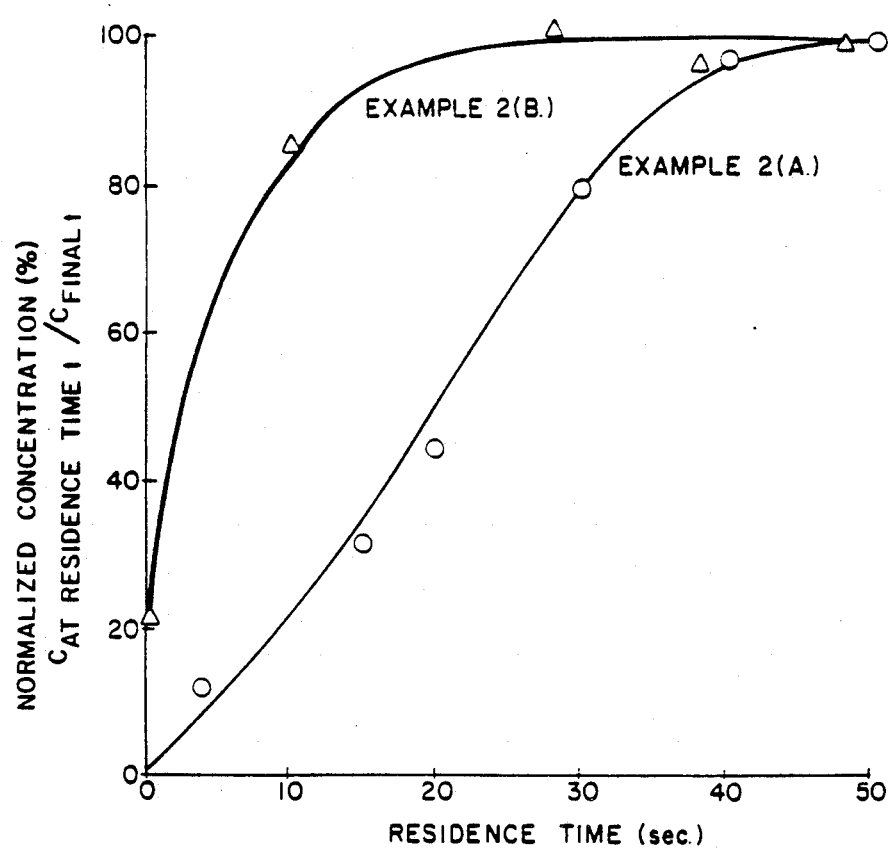
FIG. 5 is a graphic representation of polymer concentration vs. residence time for consideration with Example 2 herein.

FIG. 5 illustrates the polymer concentration-residence time relationship, with concentration being pres-

TABLE I

|  | Example 1A | Example 1B |
|---|---|---|
| Reactor Inlet Temperature (°C.) | −40 | −35 |
| Reactor Temperature (°C.) | 38 | 37.5 |
| Reactor Feed Rates |  |  |
| Hexane (kg/hr) | 39.0 | 23.7 |
| Ethylene (g/hr) | 1037 | 775 |
| Propylene (g/hr) | 1404 | 1185 |
| $VCl_4$ (g/hr) | 5.41 | 2.56 |
| $Al_2Et_3Cl_3$ (g/hr) | 17.4 | 13.2 |
| Catalyst Premixing Temperature (°C.) | Not premixed | 0 |
| Catalyst Premixing Time (sec) | Not premixed | 10 |
| Reactor Residence Time (min) | 10.5 | 17.1 |
| Rate of Polymerization (g/hr) | 2256 | 1516 |
| Catalyst Efficiency (g polymer/g V) | 416 | 591 |
| $(\overline{M}_w)^{(a)}$ | $1.5 \times 10^5$ | $2.1 \times 10^5$ |
| $(\overline{M}_w/\overline{M}_n)^{(b)}$ | 2.1 | 1.9 |
| $(\overline{M}_z/\overline{M}_w)^{(a)}$ | 1.7 | 1.7 |
| Average Composition (Ethylene wt. %)$^{(c)}$ | 43 | 47 |

Compositional Distribution$^{(d)}$

|  | Original | | Fragmented | | Inter- | Intra-CD | |
|---|---|---|---|---|---|---|---|
|  | max | min | max | min | CD | High Ethylene | Low Ethylene |
| Example 1A | 48 | 42 | 48 | 45 | +5 / −1 | 0 | 0 |
| Example 1B | 48 | 42 | 50 | 46 | +1 / −5 | +2 | 0 |

$^{(a)}$Determined by GPC/LALLS using total scattered light intensity in 1,2,4 trichlorobenzene at 135° C., Chromatix KMX-6, specific refractive index increment $dn/dc = -.104$ $(g/cc)^{-1}$ (see specification)
$^{(b)}$Determined from an elution time-molecular weight relationship as discussed in the specification, data precision ±.15
$^{(c)}$Determined by ASTM D-3900 Method A. Data good to ±2% ethylene.
$^{(d)}$Composition determined on fractions which comprise 5–20% of the original polymer weight, hexane-isopropyl alcohol is solvent-non solvent pair.
$^{(e)}$Inter-CD is determined as the difference for 95 wt. % of the polymer between the maximum and minimum of the original polymer and the average composition
$^{(f)}$Chains fragmented to ca. 5% of their original molecular weight. Intra-CD is determined as the difference in composition between the highest ethylene fractions of the original and fragmented chains and between the lowest such fractions.

EXAMPLE 2

This example is seen to illustrate the importance of reaction conditions in practicing methods in accordance with the invention such as catalyst premixing for making narrow MWD polymer with the desired Intra-CD. In examples 2(B.) and 2(C.) the catalyst components were premixed in order to obtain rapid chain initiation. In example 2(A.) the polymerization conditions were similar, but the catalyst components were fed separately to the reactor inlet.

The polymerization reactor was a one-inch diameter pipe equipped with Kenics static mixer elements along its length. Monomers, hexane, catalyst, and cocatalyst were continuously fed to the reactor at one end and the copolymer solution and unreacted monomers were ented in terms of polymer concentration at residence time t ($C_{At\ residence\ time\ t}$)/polymer concentration at final t ($C_{Final\ t}$) which exists at the end of the reactor. It is evident that in example 2(B.) the maximum polymerization rate occurs at about zero reaction time indicating fast initiation of all the polymer chains. As a result, a very narrow MWD EPM with ($\overline{M}_w/\overline{M}_n$) equal to 1.3 and ($\overline{M}_z/\overline{M}_w$) of 1.2 was produced through a process in accordance with the present invention. On the other hand, example 2(A.) shows that EPM with $\overline{M}_w/\overline{M}_n$ greater than 2.0 and $\overline{M}_z/\overline{M}_w$ of 2.0 was obtained when the proper conditions were not used. In this example, lack of premixing of the catalyst components led to a reduced rate of chain initiation and broadened MWD.

Samples of product were fractionated according to the procedure of Example 1 and as disclosed in the specification Data appear in Table II.

hexane-isopropanol separated the polymer more efficiently than CCl₄-ethyl acetate.

TABLE II

|  | Example 2A | Example 2B | Example 2C |
|---|---|---|---|
| Reactor Inlet Temperature (°C.) | −20 | −10 | −10 |
| Reactor Outlet Temperature (°C.) | −3 | 0 | 0 |
| Reactor Feed Rates |  |  |  |
| Hexane (kg/hr) | 60.3 | 60.3 | 60.3 |
| Ethylene (kg/hr) | 0.4 | 0.22 | 0.22 |
| Propylene (kg/hr) | 3.2 | 2.0 | 2.0 |
| VCl₄ (g/hr) | 2.22 | 2.22 | 2.22 |
| Al₂Et₃Cl₃ (g/hr) | 20.5 | 17.0 | 71.0 |
| Catalyst Premixing Temperature (°C.) | — | 0 | +10 |
| Catalyst Premixing Time (sec) | 0 | 10 | 10 |
| Reactor Residence Time (sec) | 52 | 50 | 35 |
| Rate of Polymerization (g/hr) | 874 | 503 | 426 |
| Catalyst Efficiency (g polymer/g VCl₄) | 394 | 227 | 192 |
| $\overline{M_w}^{(a)}$ | $2.1 \times 10^5$ | $1.4 \times 10^5$ | $9.5 \times 10^4$ |
| $(\overline{M_z}/\overline{M_w})^{(a)}$ | 2.0 | 1.2 | 1.2 |
| $(M_w/M_n)^{(b)}$ | 2.70 | 1.3 | 1.2 |
| Composition (ethene wt. %)$^{(c)}$ | 42.4 | 39.1 | 41.4 |

| Compositional Distribution$^{(d)}$ | Original | | Fragmented | | | Intra CD$^{(g)}$ | |
|---|---|---|---|---|---|---|---|
|  | max | min | max | min | Inter CD$^{(f)}$ | max | min |
| 2A | 55 | 25 | — | — | +13 / −17 | —$^{(e)}$ | —$^{(e)}$ |
| 2B | 45 | 32 | 51 | 32 | +6 / −7 | +6 | 0 |
| 2C | 49 | 34 | 51 | (39) | +8 / −7 | +2 | —$^{(e)}$ |
| 2C 3rd cut refractionated | 42 | 39 | 48 | 32 | — | 6 | −7 |
| 2C CCl₄-ethyl acetate | 45 | 34 | — | — | — | — | — |

$^{(a)}$Determined by GPC/LALLS using total scattered light intensity in 1,2,4 tri-chlorobenzene at 135° C., Chromatix KMX-6, specific refractive index increment $dn/dc = -.104(g/cc)^{-1}$ (see specification)
$^{(b)}$Determined from an elution time-molecular weight relationship as discussed in the specification data precision ±.15
$^{(c)}$Determined by ASTM D-3900 Method A. Data good to ±2% ethylene.
$^{(d)}$Composition determined on fractions which comprise 5-20% of the original polymer weight, hexame isopropyl alcohol is solvent-non solvent pair.
$^{(e)}$In these cases inter CD obscured intra CD so no increase in CD was shown on fragmentation.
$^{(f)}$Inter-CD is determined as the difference for 95 wt. % of the polymer between the maximum and minimum of the original polymer and the average composition.
$^{(g)}$Chains fragmented to ca. 5% of their original molecular weight. Intra-CD is determined as the difference in composition between the highest ethylene fractions of the original and fragmented chains and between the lowest such fractions.

Sample A, made without catalyst premixing, had a broad Inter-CD typical of the prior art (e.g., Junghanns). For samples B and C Inter-CD was much reduced as a result of the premixing.

Intra-CD is shown as the difference between the fractionation data on the fragmented and unfragmented samples. For sample B, the chains are shown to contain segments of at least 6% ethylene higher than that isolatable on the unfragmented material. The residual Inter-CD obscures the analysis of Intra-CD. To make the analysis clearer, sample C was first fractionated and then one fraction (the 3rd) was refractionated showing it to be homogeneous with regard to Inter-CD. Upon fragmentation a compositional dispersity as large as the original whole polymer Inter-CD was obtained. Thus, those chains must have had an Intra-CD of greater than 18%. The 2nd and 3rd fractions, which were similar, comprised more than 70% of the original polymer showing that the Inter-CD which obscured the Intra-CD was only due to a minor portion of the whole polymer.

Since the fractionation procedure might depend on the solvent non-solvent pair used, a second combination, carbon tetrachloride-ethyl acetate was used on the sample C whole polymer. This pair was also used in the prior art. It is apparent from the data of Table II that

EXAMPLE 3

This example illustrates the use of additional monomer feed downstream of the reactor inlet (multiple feed points) to vary polymer composition and compositional distribution while maintaining a narrow MWD. In example 3(B.), a second hexane stream containing only ethylene was fed into the reactor downstream of the inlet in addition to those feeds used at the inlet. In example 3(A.), the polymerization conditions were the same except there was no second ethylene feed. The polymerization procedures of example 2(B.) were repeated. The process conditions are listed in Table III.

Figure 6:
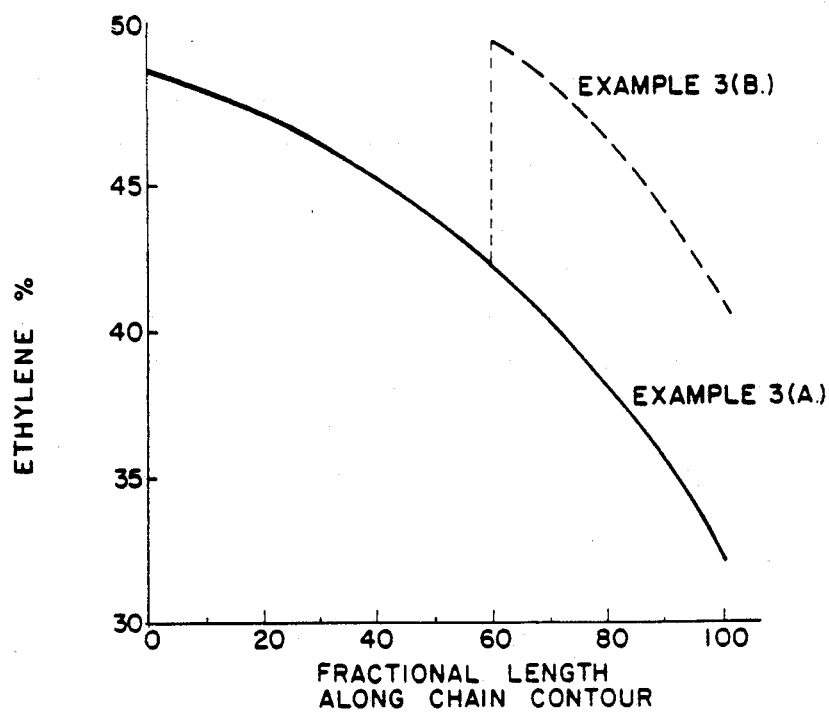
FIG. 6 is a graphic representation of intramolecular compositional dispersity (Intra-CD) of copolymer chains made with additional monomer feeds downstream of the reactor inlet as in Example 3.

The data listed in Table III show that the sample made with an additional monomer feed downstream of the reactor inlet had the same MWD as the one made with all the monomer feed at the reactor inlet. This combined with the increases in ethylene composition of the "2nd feed point" sample and the molecular weight of the final sample in example 3(B.) indicate that the monomers in the second feed had been added to the growing polymer chains. Therefore, the Intra-CD of the final product must be as shown schematically in FIG. 6.

It is apparent that since the chains continue to grow down the tube that a variety of structures can be produced by using multiple feed points as noted in the specification.

TABLE III

|  | Example 3B | Example 3A |
|---|---|---|
| Solvent Temperature (°C.) | | |
| Main Feed | −10 | −10 |
| Second Feed | 0 | — |
| Reactor Outlet Temperature (°C.) | +3 | 0 |
| Reactor Feed Rates | | |
| Hexane (kg/hr) | | |
| Main Feed | 60.7 | 60.7 |
| Second Feed | 9.9 | — |
| Ethylene (kg/hr) | | |
| Main Feed | 0.22 | 0.22 |
| Second Feed | 0.10 | — |
| Propylene (kg/hr) | 2.0 | 2.0 |
| VCl$_4$ (g/hr) | 2.22 | 2.22 |
| Al$_2$Et$_3$Cl$_3$ (g/hr) | 17.0 | 17.0 |
| Reactor Residence Time (sec) | | |
| Before the 2nd feed point | 4 | — |
| Overall | 35 | 40 |
| Premixing Temperature (°C.) | 0 | 0 |
| Premixing Time (sec) | 6 | 6 |
| Rate of Polymerization (g/hr) | 487 | 401 |
| Catalyst Efficiency (g polymer/g VCl$_4$) | 219 | 181 |
| ($\overline{M_w}$) | 1.3 × 10$^5$ | 1.0 × 10$^5$ |
| ($\overline{M_z}/\overline{M_w}$) | 1.2 | 1.3 |
| (Mw/Mn) | 1.25 | 1.24 |
| Composition (ethylene wt. %) | | |
| Reactor sample taken right after the 2nd feed point | 55.3 | 47.6 |
| Final sample | 45.4 | 41.0 |

EXAMPLE 4

The comparison in this example illustrates that narrow MWD EPM can also be produced in a tubular reactor using the vanadium oxytrichloride (VOCl$_3$)-ethyl aluminum sesqui chloride (Al$_2$Et$_3$Cl$_3$) system when the conditions described earlier are used. In example 4(B.) the catalyst components were premixed in order to obtain rapid chain initiation. In example 4(A.) the polymerization conditions were the same, but the catalyst components were fed separately to the reactor inlet. The polymerization procedures of example 2(A.) and 2(B.) were repeated. Table IV lists the run conditions.

The data in Table IV indicate that premixing of the catalyst components produces narrow MWD polymers ($\overline{M_w}/\overline{M_n}$ = 1.8 and $\overline{M_z}/\overline{M_w}$ = 1.5).

TABLE IV

|  | Example 4A | Example 4B |
|---|---|---|
| Reactor Inlet Temperature (°C.) | 0 | 0 |
| Reactor Outlet Temperature (°C.) | 7 | 12 |
| Reactor Feed Rates | | |
| Hexane (kg/hr) | 60.2 | 61.1 |
| Ethylene (kg/hr) | 0.2 | 0.4 |
| Propylene (kg/hr) | 3.6 | 2.6 |
| VOCl$_3$ (g/hr) | 1.73 | 5.07 |
| Al$_2$Et$_3$Cl$_3$ (g/hr) | 7.44 | 54.2 |
| Premixing Temperature (°C.) | — | 10 |
| Premixing Time (sec) | — | 6 |
| Reactor Residence Time (sec) | 52 | 37 |
| Rate of Polymerization (g/hr) | 685 | 359 |
| Catalyst Efficiency (g polymer/g VOCl$_3$) | 208 | 135 |
| ($\overline{M_w}$) | 2.8 × 10$^5$ | 3.3 × 10$^5$ |
| ($\overline{M_z}/\overline{M_w}$) | 2.7 | 1.5 |
| (Mw/Mn) | 2.7 | 1.8 |
| Composition (ethylene wt. %) | 40 | 49 |

EXAMPLE 5

This example illustrates that narrow MWD ethylene-propylene-diene copolymers (EPDM) can be produced in a tubular reactor with premixing of the catalyst components. The polymerization procedures of example 2(B.) were repeated, except that a third monomer, 5-ethylidene-2-norbornene (ENB) was also used. The feed rates to the reactor, premixing conditions, and the residence time for example 5(A.) and 5(B.) are listed in Table V. Also shown in Table V are the results of a control polymerization (5C) made in a continuous flow stirred tank reactor.

The copolymer produced was recovered and analyzed by the procedures described in Example 1 above. In addition, the ENB content was determined by refractive index measurement (I. J. Gardner and G. Ver Strate, *Rubber Chem. Tech.* 46, 1019 (1973)). The molecular weight distribution, rate of polymerization and compositions are shown in Table V.

The data listed in Table V clearly demonstrate that processes in accordance with the present invention also result in very narrow MWD for EPDM.

Sample 5(B.) and 5(C.), a polymer made in a continuous flow stirred reactor with similar composition and molecular weight, were compounded in the following formulation:

| Polymer | 100 |
|---|---|
| High Abrasion Furnace Black (PHR) | 80 |
| Oil (PHR) | 50 |
| ZnO (PHR) | 2 |
| Tetramethylthiuram Disulfide (PHR) | 1 |
| 2-Mercaptobenzothiazole (PHR) | 0.5 |
| S (PHR) | 1.5 |

The cured properties of these compounds are shown below:

|  | 5B | Control (5C) |
|---|---|---|
| Cure 160° C./10' | | |
| Tensile | 1334 | 1276 |
| Elong. | 570 | 550 |
| 100% Mod. | 244 | 261 |
| 200% Mod. | 412 | 435 |
| 300% Mod. | 600 | 618 |
| 400% Mod. | 840 | 841 |
| 500% Mod. | 1160 | 1102 |
| Shore A | 78 | 80 |
| | Monsanto: 160° C./60', 1° arc, 0–50 Range[a] (in-lb/dNm) | |
| ML[b] | 2.8/3.2 | 4.0/4.5 |
| MH[c] | 37.2/42.0 | 35.0/39.6 |
| ts2[d] | 2.8 | 3.0 |
| t'90[e] | 22.2 | 18.5 |
| Rate | 7.9/8.9 | 5.9/6.7 |

(a) Monsanto Rheometer, Monsanto Company (Akron, OH)
(b) ML = Cure meter minimum torque; ASTM D2084-81
(c) MH = Cure meter maximum torque; ASTM D2084-81
(d) ts2 = Time (in minutes) to 2-point rise above minimum torque; ASTM D2084-81
(e) t'90 = Time (in minutes) to reach 90% of maximum torque rise above minimum; ASTM D2084-81.

These data show that the cure rate of the narrow MWD polymer was greater than that for the continuous flow stirred reactor control polymer even though Mooney viscosity and ENB content were lower for the former. Thus, the benefit of narrow MWD on cure rate is shown.

TABLE V

|  | Example 5A | Example 5B | Example 5C |
|---|---|---|---|
| Reactor | Tubular | Tubular | Stirred Tank |
| Reactor Inlet Temperature (°C.) | 0 | −20 |  |
| Reactor Outlet Temperature (°C.) | 20 | −10 |  |
| Reactor Feed Rates |  |  |  |
| Heaxane (kg/hr) | 60.9 | 60.9 |  |
| Ethylene (kg/hr) | 0.65 | 0.20 |  |
| Propylane (kg/hr) | 5.5 | 2.15 |  |
| Diene (kg/hr) | 0.036 | 0.026 |  |
| $VCl_4$ (g/hr) | 5.24 | 2.22 |  |
| $Al_2Et_3Cl_3$ (g/hr) | 40.4 | 21.4 |  |
| Catalyst Premixing Temperature (°C.) | 0 | −20 |  |
| Catslyst Premixing Time (sec) | 6 | 10 |  |
| Reactor Residenece Time (sec) | 30 | 48 |  |
| Rate of Polymerization (g/hr) | 1479 | 454 |  |
| Catalyst Efficiency (g polymer/g $VCl_4$) | 282 | 205 |  |
| ($M_w$) | $1.3 \times 10^5$ | $1.2 \times 10^5$ | 1.6 |
| ($M_z/M_w$) | 1.37 | 1.30 | 4. |
| ($M_w/M_n$) | 1.44 | 1.61 | 4. |
| Mooney Viscosity ML (1 + 8) 100° C. | 45 | 51 | 55 |
| Composition |  |  |  |
| Ethylene wt. % | 39.3 | 39.3 | 49. |
| ENB wt. % | 3.5 | 4.2 | 4.5 |
| Cure Rate (dNm) | — | 8.9 | 6.7 |

EXAMPLE 6

This example illustrates that narrow MWD EPM can be produced in a tubular reactor with a different configuration when the critical process conditions in accordance with the present invention are used. The polymerization reactor consisted of 12 meters of a ⅜" tubing. The experimental procedures of example 2(B.) were repeated. The process conditions are listed in Table VI.

Data listed in Table VI show that this tubular reactor produced polymer with an MWD as narrow as that of polymers made in the 1" pipe used in the previous example.

TABLE VI

| Reactor Inlet Temperature (°C.) | −1 |
|---|---|
| Reactor Outlet Temperature (°C.) | 30 |
| Reactor Feed Rates |  |
| Hexane (kg/hr) | 31.1 |
| Ethylene (kg/hr) | 0.7 |
| Propylene (kg/hr) | 11 |
| $VCl_4$ (g/hr) | 8.27 |
| $Al_2Et_3Cl_3$ (g/hr) | 58.5 |
| Reactor Residence Time (sec) | 45 |
| Catalyst Premixing Temperature (°C.) | 10 |
| Catalyst Premixing Time (sec) | 6 |
| Rate of Polymerization (g/hr) | 1832 |
| Catalyst Efficiency (g polymer/g $VCl_4$) | 222 |
| ($M_w$) | $1.4 \times 10^5$ |
| ($M_z/M_w$) | 1.4 |
| ($M_w/M_n$) | 1.5 |
| Composition (ethylene wt. %) | 38 |

EXAMPLES 7-10

In these examples, polymers made as described in the previous examples were dissolved in lubricating oil basestock and the viscosity effects were evaluated. The narrow MWD and intramolecular compositional distribution of these polymers provide improvements in MRV (Mini Rotary Viscosity) and SSI (Shear Stability Index).

MRV: This is a viscosity measurement in centipoises (cps) at −25° C. according to ASTM-D 3829 using the Mini-Rotary Viscometer and is an industry accepted evaluation for the low temperature pumpability of a lubricating oil.

T.E.: This represents Thickening Efficiency and is defined as the ratio of the weight percent of a polyisobutylene (sold as an oil solution by Exxon Chemical Company as Paratone N), having a Staudinger molecular weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.3 centistokes at 98.9° C., to the weight percent of a test copolymer required to thicken the same oil to the same viscosity at the same temperature.

SSI: This value is Shear Stability Index and measures the stability of polymers used as V.I. improvers in motor oils subjected to high shear rates. In this method the sample under test is blended with a typical basestock to a viscosity increase at 210° F. of 7.0±5 centistokes. Two portions of the blend are successively subjected to sonic shearing forces at a specific power input and a constant temperature for 15 minutes. Viscosities are determined on the blends both before and after the treatment; the decrease in viscosity after the treatment is a measure of the molecular breakdown of the polymer under test. A series of standard samples is used as a reference to establish the correct value for the sample under test. The corrected value is reported as the SSI which is the percent sonic breakdown to the nearest 1%.

In these tests, a Raytheon Model DF 101, 200 watt, 10 kilocycle sonic oscillator was used, the temperature was 37 ±4° C., power input is 0.75 ampere, time of test is 15.0 minutes ±10 seconds.

EXAMPLE 7

In this example, polymers made as described in Example 1 and 2 were dissolved in lubricating oil to provide a kinematic viscosity of 13.5 centistokes at 100° C. (ASTM D445) SSI was measured in Solvent 150 Neutral basestock (31 cS. min at 100° F., pour point of 50° F. and broad wax distribution). MRV was measured in a Mid-Continent basestock being a mixture of Solvent 100 Neutral (20 cS. Min at 100° F.) and Solvent 250 Neutral (55 cS min. at 100° F.) and having a narrow ($C_{24}-C_{36}$) wax distribution and containing 0.2 wt % vinyl acetate fumarate pour depressant (Paraflow 449, Exxon Chemical Co.)

Results are tabulated below:

| Oil Containing Copolymer as Described In: | Ethylene wt % | Shear Stability | | Pumpability MRV @ −25° C. cps |
| --- | --- | --- | --- | --- |
| | | Thickening Efficiency | SSI % Loss | |
| Example 1 | 42 | 2.8 | 28 | 32,500 |
| Example 2A | 42 | 3.6 | 44 | 270,000 |
| Example 2B | 39 | 2.7 | 18 | 25,000 |
| Example 2C | 41 | 2.06 | 8 | 20,000 |

These data clearly show the improvements in SSI and MRV possible with the polymers of the present invention. Example 2B outperformed Example 1 in SSI at the same TE. Both Examples 2B and 2C, made with premixed catalyst, outperformed Example 1 (made as in Ex. 1) from the backmixed reactor, and Example 2A, made with no premixing and having the broad inter CD.

EXAMPLE 8

In this example it is shown that the polymer of Example 3, which was made with multiple ethylene feeds and which retained its narrow MWD even with a second ethylene feed, has good shear stability.

| Sample | TE | SSI % Loss |
| --- | --- | --- |
| Example 2B | 2.7 | 18 |
| Example 3B | 2.6 | 14.5 |

The shear stability of 3B was equivalent to the polymer made with the single feed. Thus, it is possible to tailor compositional distribution without significantly affecting MWD and SSI.

EXAMPLE 9

In this example it is shown that the premixing of the VOCl$_3$ catalyst components of Example 4, which effected a narrowing of MWD, permits a much higher TE polymer to be employed with the same SSI, as shown in Table 9.

TABLE 9

| Sample | TE | SSI % Loss |
| --- | --- | --- |
| Example 4A | 3.8 | 52 |
| Example 4B | 4.9 | 53 |

It should be noted, however, that a polymer of the same TE as the polymer of Example 4A, when made with premixing exhibits much better SSI than the Example 4A.

EXAMPLE 10

This example demonstrates a terpolymer in accordance with this invention exhibits the same viscosity improvements. A terpolymer sample was prepared as in Example 5(A). This sample was tested for SSI and MRV. Sample analysis and results appear in Table 10.

TABLE 10

| Sample | Ethylene wt % | ENB wt % | TE | MRV | SSI, % Loss |
| --- | --- | --- | --- | --- | --- |
| Example 10A | 39.3 | 3.5 | 2.5 | 33,000 | 29 |

What is claimed is:

1. Copolymer of ethylene and at least one other alpha-olefin monomer, said copolymer having an average ethylene composition and comprising intramolecularly hetergeneous copolymer chains wherein at least two portions of an individual intramolecularly hetergeneous chain, each portion comprising at least 5 weight percent of said chain, differ in composition from one another by at least 5 weight percent ethylene, wherein said copolymer has an intermolecular compositional dispersity such that 95 weight percent of said copolymer chains have a composition 15 weight percent or less different from said average ethylene composition, and wherein said copolymer has a weight average molecular weight of from about 2,000 to about 12,000,000, and a MWD characterized by at least one of a ratio of $\overline{M}_w/\overline{M}_n$ of less than 2 and a ratio of $\overline{M}_z/\overline{M}_w$ of less than 1.8.

2. A copolymer according to claim 1, wherein said intermolecular compositional dispersity of said copolymer is such that 95 weight percent of said copolymer chains have a composition 13% or less different from said average ethylene composition.

3. A copolymer according to claim 1, wherein said intermolecular compositional dispersity of said copolymer is such that 95 weight percent of said copolymer chains have a composition 10% or less different from said average ethylene composition.

4. A copolymer according to claim 1, wherein said at least two portions of an individual chain differ in composition from one another by at least 10 weight percent ethylene.

5. A copolymer according to claim 1, wherein said at least two portions of an individual chain differ in composition from one another by at least 20 weight percent ethylene.

6. A copolymer according to claim 1, wherein said at least two portions of an individual chain differ in composition from one another by at least 40 weight percent ethylene.

7. A copolymer according to claim 1, which has a MWD characterized by both a ratio of $\overline{M}_w/\overline{M}_n$ of less than about 1.6 and a ratio of $\overline{M}_z/\overline{M}_w$ of less than about 1.5.

8. A copolymer according to claim 1, which has a MWD characterized by at least one of a ratio of $\overline{M}_w/\overline{M}_n$ of less than about 1.6 and a ratio of $\overline{M}_z/\overline{M}_w$ of less than about 1.5.

9. A copolymer according to claim 8, wherein said intermolecular compositional dispersity of said copolymer is such that 95 weight percent of said copolymer chains have a composition 13% or less different from said average ethylene composition, and wherein said at least two portions of an individual chain differ in composition from one another by at least 10 weight percent ethylene.

10. A copolymer according to claim 9 which is comprised of ethylene, propylene and ENB.

11. A copolymer according to claim 9 which is cured.

12. A copolymer according to claim 9, wherein said at least two portions of an individual chain differ in composition from one another by at least 40 weight percent ethylene.

13. A copolymer according to claim 1, which has a MWD characterized by at least one of a ratio of $\overline{M}_w/\overline{M}_n$ of less than about 1.4 and a ratio of $\overline{M}_z/\overline{M}_w$ of less than about 1.3.

14. A copolymer according to claim 13, wherein said intermolecular compositional dispersity of said copolymer is such that 95 weight percent of said copolymer chains have a composition 10% or less different from said average ethylene composition, and wherein said at least two portions of an individual chain differ in composition from one another by at least 20 weight percent ethylene.

15. A copolymer according to claim 14, wherein said at least two portions of an individual chain differ in composition from one another by at least 40 weight percent ethylene.

16. A copolymer according to claim 1 which has a MWD characterized by both of a ratio of $\overline{M}_w/\overline{M}_n$ of less than about 1.4 and a ratio of $\overline{M}_z/\overline{M}_w$ of less than about 1.3.

17. A copolymer according to claim 1, having a total maximum ethylene content of about 85% on a weight basis.

18. A copolymer according to claim 1, having a total maximum ethylene content of about 90% on a weight basis.

19. A copolymer according to claim 18, wherein said intermolecular compositional dispersity of said copolymer is such that 95 weight percent of said copolymer chains have a composition 13% or less different from said average ethylene composition.

20. A copolymer according to claim 18, wherein said intermolecular compositional dispersity of said copolymer is such that 95 weight percent of said copolymer chains have a composition 10% or less different from said average ethylene composition.

21. A copolymer according to claim 18, wherein said at least two portions of an individual chain differ in composition from one another by at least 10 weight percent ethylene.

22. A copolymer according to claim 18, wherein said at least two portions of an individual chain differ in composition from one another by at least 20 weight percent ethylene.

23. A copolymer according to claim 18, wherein said at least two portions of an individual chain differ in composition from one another by at least 40 weight percent ethylene.

24. A copolymer according to claim 18, which has a MWD characterized by at least one of a ratio of $\overline{M}_w/\overline{M}_n$ of less than about 1.6 and a ratio of $\overline{M}_z/\overline{M}_w$ of less than about 1.5.

25. A copolymer according to claim 24, wherein said intermolecular compositional dispersity of said copolymer is such that 95 weight percent of said copolymer chains have a composition 13% or less different from said average ethylene composition, and wherein said at least two portions of an individual chain differ in composition from one another by at least 10 weight percent ethylene.

26. A copolymer according to claim 25, wherein said at least two portions of an individual chain differ in composition from one another by at least 40 weight percent ethylene.

27. A copolymer according to claim 25, further comprising diene.

28. A copolymer according to claim 27, wherein the total ethylene content if about 30% to 75% on a weight basis.

29. A copolymer according to claim 18, which has a MWD characterized by both a ratio of $\overline{M}_w/\overline{M}_n$ of less than about 1.6 and a ratio of $\overline{M}_z/\overline{M}_w$ of less than about 1.5.

30. A copolymer according to claim 18, which has a MWD characterized by at least one of a ratio of $\overline{M}_w/\overline{M}_n$ of less than about 1.4 and a ratio of $\overline{M}_z/\overline{M}_w$ of less than about 1.3.

31. A copolymer according to claim 20, wherein said intermolecular compositional dispersity of said copolymer is such that 95 weight percent of said copolymer chains have a composition 10% or less different from said average ethylene composition, and wherein said at least two portions of an individual chain differ in composition from one another by at least 20 weight percent ethylene.

32. A copolymer according to claim 31, wherein said at least two portions of an individual chain differ in composition from one another by at least 40 weight percent ethylene.

33. A copolymer according to claim 18, which has a MWD characterized by both of a ratio of $\overline{M}_w/\overline{M}_n$ of less than about 1.4. and a ratio of $\overline{M}_z/\overline{M}_w$ of less than about 1.3.

34. A copolymer according to claim 1, having a total ethylene content of greater than about 25% on a weight basis.

35. A copolymer according to claim 1, further comprising diene.

36. A copolymer according to claim 1 which is cured.

37. A copolymer according to claim 1 which has a weight average molecular weight of about 10,000 to 1,000,000.

38. A copolymer according to claim 1, which has a weight average molecular weight of about 20,000 to 750,000.

39. Copolymer of ethylene and at least one other alpha-olefin monomer, said copolymer having an average ethylene composition and comprising intramolecularly hetergeneous copolymer chains wherein at least two portions of an individual intramolecularly heterogeneous chain, each portion comprising at least 5 weight percent of said chain, differ in composition from one another by at least 5 weight percent ethylene, wherein said substantially all said portions contain ethylene, wherein said copolymer has an intermolecular compositional dispersity such that 95 weight percent of said copolymer chains have a composition 15 weight percent or less different from said average ethylene composition, and wherein said copolymer has a MWD characterized by at least one of a ratio of $\overline{M}_w/\overline{M}_n$ of less than 2 and a ratio of $\overline{M}_z/\overline{M}_w$ of less than 1.8, and wherein said copolymer has a weight average molecular weight of from about 15,000 to about 12,000,000.

40. A copolymer according to claim 39, wherein said intermolecular compositional dispersity of said copolymer is such that 95 weight percent of said copolymer chains have a composition 13% or less different from said average ethylene composition.

41. A copolymer according to claim 29, wherein said intermolecular compositional dispersity of said copolymer is such that 95 weight percent of said copolymer chains have a composition 10% or less different from said average ethylene composition.

42. A copolymer according to claim 29, wherein said at least two portions of an individual chain differ in composition from one another by at least 10 weight percent ethylene.

43. A copolymer according to claim 40, wherein said at least two portions of an individual chain differ in composition from one another by at least 20 weight percent ethylene.

44. A copolymer according to claim 39, wherein said at least two portions of an individual chain differ in composition from one another by at least 40 weight percent ethylene.

45. A copolymer according to claim 39, which has a MWD characterized by at least one of a ratio of $\overline{M}_w/\overline{M}_n$ of less than about 1.6 and a ratio of $\overline{M}_z/\overline{M}_w$ of less than about 1.5.

46. A copolymer according to claim 45, wherein said intermolecular compositional dispersity of said copolymer is such that 95 weight percent of said copolymer chains have a composition 13% or less different from said average ethylene composition, and wherein said at least two portions of an individual chain differ in composition from one another by at least 10 weight percent ethylene.

47. A copolymer according to claim 46, wherein said at least two portions of an individual chain differ in composition from one another by at least 40 weight percent ethylene.

48. A copolymer according to claim 46, which is comprised of ethylene, propylene and ENB.

49. A copolymer according to claim 46 which is cured.

50. A copolymer according to claim 39, which has a MWD characterized by both a ratio of $\overline{M}_w/\overline{M}_n$ of less than about 1.6 and a ratio of $\overline{M}_z/\overline{M}_w$ of less than 1.5.

51. A copolymer according to claim 39, which has a MWD characterized by at least one of a ratio of $\overline{M}_w/\overline{M}_n$ of less than about 1.4 and a ratio of $\overline{M}_z/\overline{M}_w$ of less than about 1.3.

52. A copolymer according to claim 51, wherein said intermolecular compositional dispersity of said copolymer is such that 95 weight percent of said copolymer chains have a composition 10% or less different from said average ethylene composition, and wherein said at least two portions of an individual chain differ in composition from one another by at least 20 weight percent ethylene.

53. A copolymer according to claim 52, wherein said at least two portions of an individual chain differ in composition from one another by at least 40 weight percent ethylene.

54. A copolymer according to claim 39, which has a MWD characterized by both of a ratio of $\overline{M}_w/\overline{M}_n$ of less than about 1.4 and a ratio of $\overline{M}_z/\overline{M}_w$ of less than about 1.3.

55. A copolymer according to claim 39, having a total maximum ethylene content of about 90% on a weight basis.

56. A copolymer according to claim 55, wherein said intermolecular compositional dispersity of said copolymer is such that 95 weight percent of said copolymer chains have a composition 13% or less different from said average ethylene composition.

57. A copolymer according to claim 55, wherein said intermolecular compositional dispersity of said copolymer is such that 95 weight percent of said copolymer chains have a composition 10% or less different from said average ethylene composition.

58. A copolymer according to claim 55, wherein said at least two portions of an individual chain differ in composition from one another by least 10 weight percent ethylene.

59. A copolymer according to claim 55, wherein said at least two portions of an individual chain differ in composition from one another by least 20 weight percent ethylene.

60. A copolymer according to claim 55, wherein said at least two portions of an individual chain differ in composition from one another by least 40 weight percent ethylene.

61. A copolymer according to claim 55, which has a MWD characterized by at least one of a ratio of $\overline{M}_w/\overline{M}_n$ of less than about 1.6 and a ratio of $\overline{M}_z/\overline{M}_w$ of less than about 1.5.

62. A copolymer according to claim 61, wherein said intermolecular compositional dispersity of said copolymer is such that 95 weight percent of said copolymer chains have a composition 13% or less different from said average ethylene composition, and wherein said at least two portions of an individual chain differ in composition from one another by at least 10 weight percent ethylene.

63. A copolymer according to claim 62, wherein said at least two portions of an individual chain differ in composition from one another by least 40 weight percent ethylene.

64. A copolymer according to claim 62, further comprising diene.

65. A copolymer according to claim 64, wherein the total ethylene content is about 30% to 75% on a weight basis.

66. A copolymer according to claim 55, which has a MWD characterized by both a ratio of $\overline{M}_w/\overline{M}_n$ of less than about 1.6 and a ratio of $\overline{M}_z/\overline{M}_w$ of less than about 1.5.

67. A copolymer according to claim 55, which has a MWD characterized by at least one of a ratio of $\overline{M}_w/\overline{M}_n$ of less than about 1.4 and a ratio of $\overline{M}_z/\overline{M}_w$ of less than about 1.3.

68. A copolymer according to claim 67, wherein said intermolecular compositional dispersity of said copolymer is such that 95 weight percent of said copolymer chains have a composition 10% or less different from said average ethylene composition, and wherein said at least two portions of an individual chain differ in composition from one another by at least 20 weight percent ethylene.

69. A copolymer according to claim 68, wherein said at least two portions of an individual chain differ in composition from one another by at least 40 weight percent ethylene.

70. A copolymer according to claim 55, which has a MWD characterized by both a ratio of $\overline{M}_w/\overline{M}_n$ of less than about 1.4 and a ratio of $\overline{M}_z/\overline{M}_w$ of less than about 1.3.

71. A copolymer according to claim 39, having a total maximum ethylene content of about 85% on a weight basis.

72. A copolymer according to claim 39, having a total ethylene content of greater than about 25% on a weight basis.

73. A copolymer according to claim 39, further comprising diene.

74. A copolymer according to claim 39 which is cured.

75. A copolymer according to claim 39, which has a weight average molecular weight of about 15,000 to 12,000,000.

76. A copolymer according to claim 39, which has a weight average molecular weight of about 15,000 to 12,000,000.

77. A copolymer according to claim 39, which has a weight average molecular weight of about 20,000 to 750,000.

78. A copolymer according to claim 39, wherein said copolymer was formed by a polymerization conducted:
(a) in at least one mix-free reactor,
(b) with essentially one active catalyst species,
(c) using at least one reaction mixture which is essentially transfer agent-free, and which comprises ethylene at the initiation of said polymerization, and
(d) in such a manner and under conditions sufficient to initiate propagation of essentially all copolymer chains simultaneously.

79. A copolymer according to claim 78, wherein said catalyst comprises hydrocarbon-soluble vanadium compound and organo-aluminum compound which react to form essentially one active catalyst species, at least one of the vanadium compound and organo-aluminum compound containing a valence-bonded halogen.

80. A copolymer according to claim 79, wherein said polymerization reaction is continuous and is conducted in hexane solvent.

81. A copolymer according to claim 79, wherein said catalyst comprises:
(a) hydrocarbon-soluble vanadium compound selected from the group consisting of:

$VCl_x(OR)_{3-x}$, where $x=0-3$ and $R=$hydrocarbon radical;
$VCl_4$;
$VO(AcAc)_2$, where $AcAc=$acetyl acetonate;
$VOCl_x(AcAc)_{3-x}$, where $x=1$ or 2 and $AcAc=$acetyl acetonate; and
$VCl_3.nB$, where $n=2-3$ and $B=$Lewis base capable of forming hydrocarbon-soluble complexes with $VCl_3$; and (b) organo-aluminum compound selected from the group consisting of:
$AlR_3$;
$AlR_2Cl$;
$Al_2R_3Cl_3$;
$AlRCl_2$;
$AlR'RCl$;
$Al(OR')R_2$;
$R_2Al—OAlR_2$; and
$AlR_2I$;
where R and $R^1$ are hydrocarbon radicals.

82. A copolymer according to claim 81, wherein said catalyst comprises $VCl_4$ and $Al_2R_3Cl_3$.

83. A copolymer according to claim 78, wherein said polymerization is conducted in at least one tubular reactor.

84. A copolymer according to claim 83, wherein said reaction mixture further comprises diene, and wherein at least one of said ethylene, other alpha-olefin monomer and diene are fed to said tubular reactor at multiple feed sites.

* * * * *